Aug. 30, 1955     E. J. CROSSLAND     2,716,747
RADIO LOCATION SYSTEM
Filed Aug. 26, 1953     4 Sheets-Sheet 2
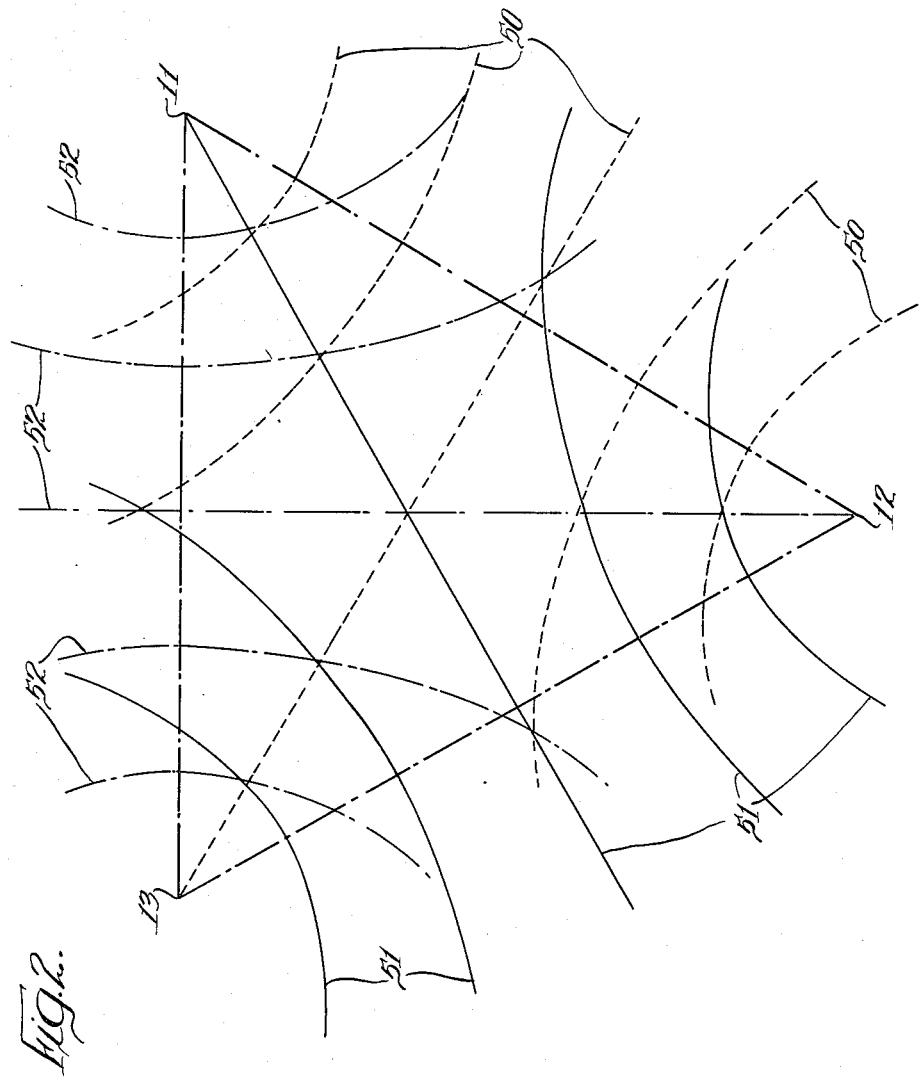
INVENTOR.
Edward J. Crossland
BY
Mason, Kolehmainen, Rathburn & Wyss
Attys.

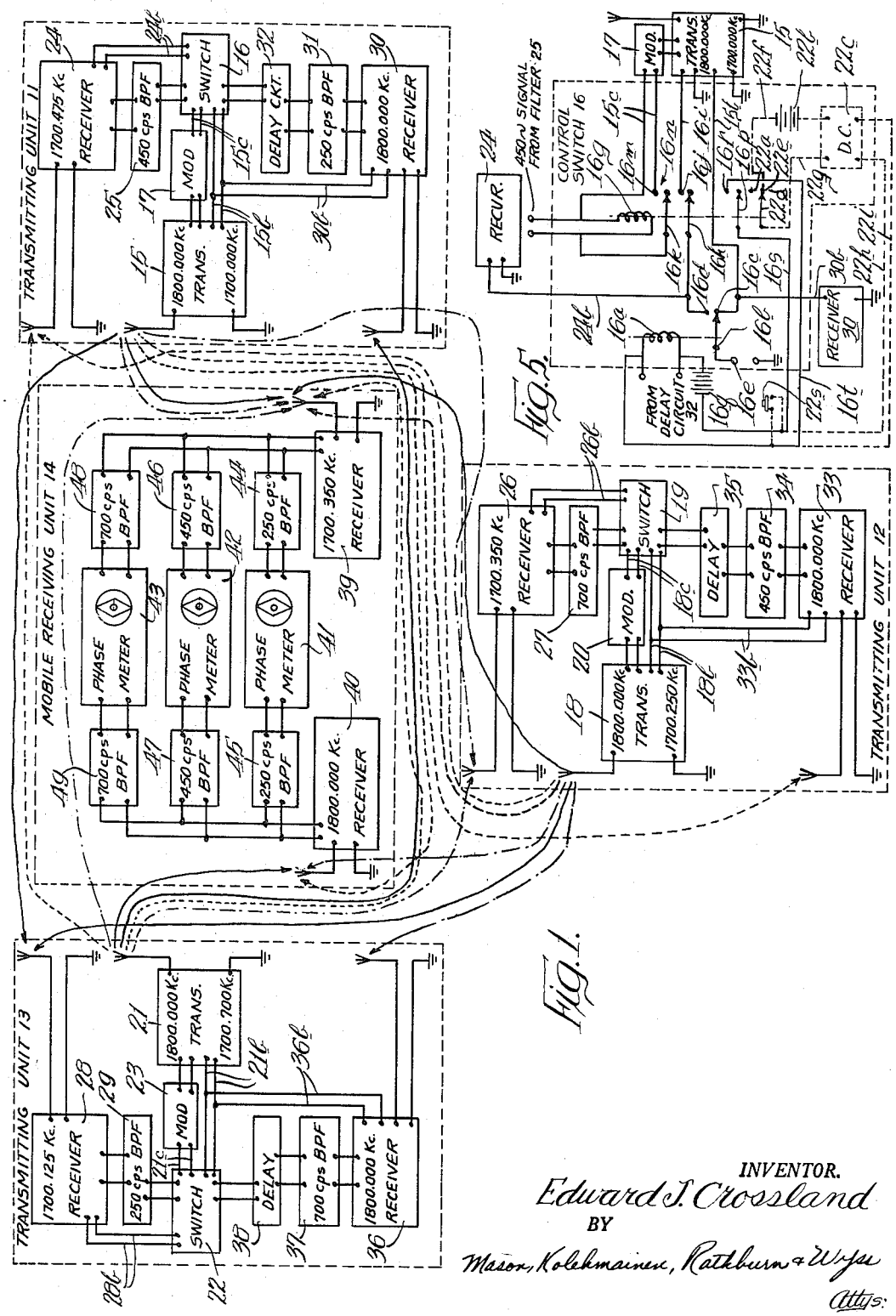

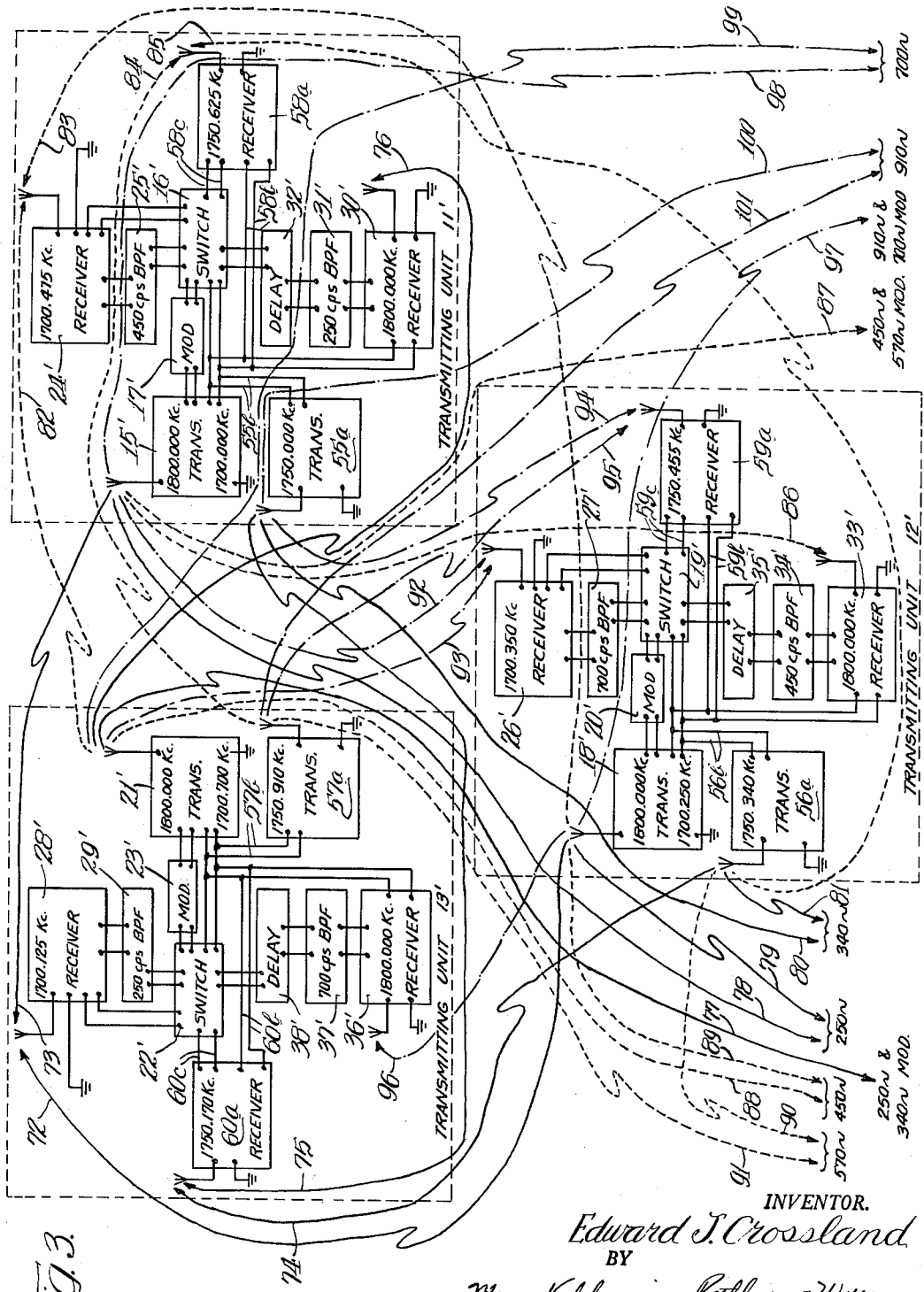

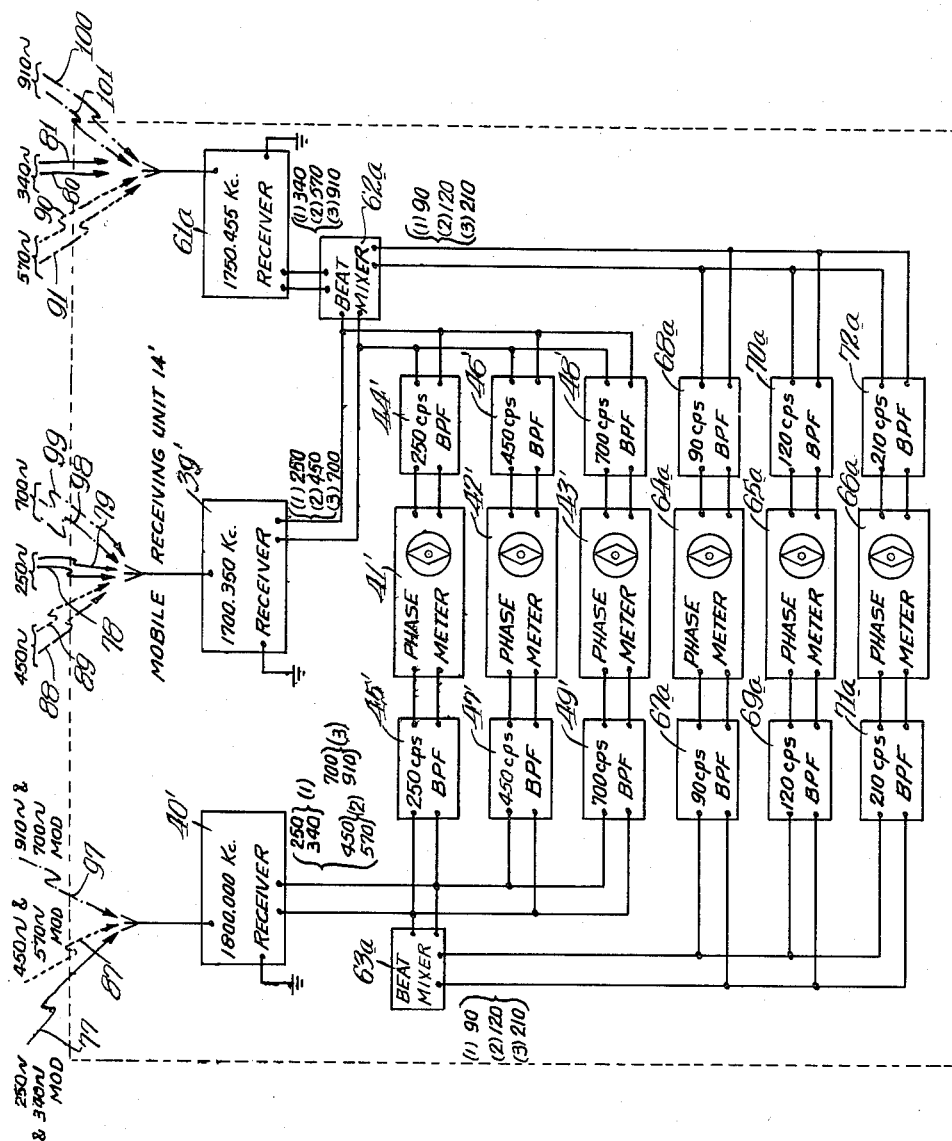

United States Patent Office 2,716,747
Patented Aug. 30, 1955

2,716,747

RADIO LOCATION SYSTEM

Edward J. Crossland, Tulsa, Okla., assignor to Seismograph Service Corporation, Tulsa, Okla., a corporation of Delaware Application August 26, 1953, Serial No. 376,554

37 Claims. (Cl. 343—105)

The present invention relates to radio position finding systems and more particularly to improvements in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by isophase lines which are hyperbolic in contour about the transmitting points as foci. On a line bisecting the pair of transmitters, these isophase lines are spaced apart a distance equal to one-half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed (see Honore Patent No. 2,148,267 issued February 21, 1939) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of equiphase lines.

While the described arrangement for obviating the phase synchronization problem is entirely satisfactory, it entails the use of two carrier channels in addition to the three or four channels taken up by the three or four continuously operating survey transmitters, in order to make up a complete system.

An improved arrangement for eliminating the link transmitters without eliminating the functions thereof is disclosed and broadly claimed in Hawkins and Finn Patent No. 2,513,317, issued July 4, 1950, wherein a pair of transmitters are alternately operated as link transmitters and as position signal transmitters. Systems of the type referred to are generally set up to cover a particular area of limited size and for this purpose the transmitters are spaced at optimum distances along two sides of the area to be surveyed to establish a hyperbolic pattern characterized by closely spaced equiphase lines thereby providing maximum accuracy of phase indications in the survey area. Frequently, however, it becomes desirable to provide a system which affords complete 360° coverage of an extensive area without relocating the transmitting apparatus while the survey is in progress. One system for providing this complete area coverage is disclosed and broadly claimed in a copending joint application Serial No. 375,264, filed August 21, 1953, of the present inventor and James E. Hawkins in which six transmitters using three channel frequencies are positioned in a star-like arrangement to radiate signals throughout a survey area having one of the transmitting units approximately at its center. It is desirable that the channel frequencies employed be located adjacent the broadcast band or at least below the ultrahigh frequency band in order to obviate the problem of line-of-sight transmission, which of course necessitates the location of a number of channel frequencies in the most crowded portion of the frequency spectrum, at least insofar as operations in the United States are concerned. Since frequency allocations in this band must be maintained at a minimum, it is highly desirable to provide a complete coverage system which reduces the number of channels required.

Another problem encountered in the operation of continuous wave systems is that of eliminating ambiguity from the phase measurements which provide the desired position information. Thus while the two phase measurements identify the position of the receiving station relative to two intersection pairs of hyperbolic isophase lines, they do not indicate the particular pairs of lines to which the indications are related. This means that in operating the system the geographic location of the receiving system must be known at the start of movement of the receiving system relative to the transmitting stations and, furthermore, that the successive wave lengths must be counted as the receiving station is moved relative to the grid-like pattern of hyperbolic lines. It also means that a mobile craft entering the radiation pattern of the transmitters at an unknown position cannot utilize the radiated signals to determine its position without employing auxiliary equipment to determine the approximate position of the craft relative to the signal transmitters.

In a copending application Serial No. 138,235, filed January 12, 1950, entitled Radio Location System, now Patent No. 2,652,558 issued September 15, 1953, and assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, insofar as the spacing of the isophase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The high and low phase sensitivity indications are obtained by producing pairs of beat frequency signals in accordance with the principles of the Honore system and then heterodyning these beat frequency signals to produce position indicating and reference signals for phase comparison which have phase sensitivities determined by phantom frequencies corresponding to the sum of or the difference between the mean frequencies of the carrier waves from which the pairs of beat frequency signals were derived.

While this latter system completely solves the ambiguity problem, a considerable number of transmitters and carrier channels are required and a number of narrow band pass filters must be employed to separate the various position indicating and reference signals, which adds to the expense and may cause phase shift difficulties unless the band pass filters are carefully selected and balanced. In United States Patent No. 2,629,091 entitled Radio Location System, issued February 17, 1953, there is disclosed and claimed an improved radio location system of the continuous wave type which is free of phase synchronization difficulties of the character mentioned, in which the above mentioned disadvantages pertaining to ambiguity are entirely obviated, and in which the use of narrow band pass filters is minimized or eliminated.

In accordance with the present invention, complete 360° coverage of a large area is achieved by employing only three transmitters and two frequency channels. If desired, additional transmitters and a third frequency channel may be added to incorporate a lane identification system of the type disclosed and claimed in the above-identified Patent 2,629,091 thereby completely obviating the ambiguity problems mentioned. It is an object of the invention therefore to provide an improved radio location system of the continuous wave type which is free of phase synchronization difficulties of the character mentioned and in which disadvantages pertaining to ambiguity are eliminated.

It is another object of the present invention to provide an improved radio location system of the continuous wave type which effects complete coverage of a relatively large area while at the same time combining economy of frequencies with a precise position determination.

It is a further object of the invention to provide a radio position finding system affording complete 360° coverage over an extensive area in which a plurality of low phase sensitivity indications and high phase sensitivity indications are obtained, the low phase sensitivity indications being effective to locate the range of the high phase sensitivity locations and being characterized by widely spaced phase coincidences, and the high phase sensitivity indications being characterized by closely spaced phase coincidences.

It is a still further object of the present invention to provide a radio position finding system of the character described in which non-ambiguous position indications are obtained.

Still another object of the invention is to provide a radio position indicating system of the character described wherein high phase sensitivity and low phase sensitivity position indications are obtained while employing a minimum number of carrier frequencies suitable for efficient long-range propagation.

It is likewise an object of the present invention to provide improved transmission systems for use in radio location systems of the above-indicated character.

It is also an object of the invention to provide improved receiving equipment for use in radio location systems of the above indicated character.

The invention both as to its organization and method of operation, together with further objects and advantages thereof will best be understood by reference to the specification, taken in connection with the accompanying drawings, in which:

Fig. 1 is a diagrammatic representation of a three foci position indicating system embodying the present invention;

Fig. 2 is a diagrammatic illustration of the positional arrangement of the transmitters embodied in the system of Fig. 1 and the grid-like pattern of isophase lines effectively produced in space as a result of signal radiation by the transmitters;

Figs. 3 and 4, when taken together, constitute a diagrammatic representation of a three-foci system of the type shown in Fig. 1 providing complete area coverage, and including means for providing unambiguous position fixes through the use of high and low phase sensitivity indications, Fig. 3 representing the transmitting end of the system and Fig. 4 representing the mobile receiving equipment; and Fig. 5 is a schematic diagram illustrating one type of control switch which may be employed in conjunction with the transmitting equipment of the present invention.

In order to illustrate the action which occurs at the various transmitters and receivers, the drawings include arrow-pointed solid lines, arrow-pointed dashed lines, and arrow-pointed dot-dash lines which indicate the receiving points of signal acceptance and the sources of the accepted signals during spaced intervals in which pairs of the transmitters are sequentially operated to radiate pairs of position indicating signals as will be more fully described hereinafter.

Referring now to Fig. 1 of the drawings, the invention is illustrated as embodied in a three-foci hyperbolic continuous wave system for providing position information at a mobile receiving unit 14 which may be carried by vessels or vehicles operating within the radius of transmission of a plurality of spaced transmitting units 11, 12 and 13. These units are preferably spaced apart approximately equal distances and are so positioned that the line joining the points of location of the units 11 and 12 is angularly related to the line joining the points of location of the units 11 and 13 and, similarly, the line joining the points of location of the units 12 and 13 is angularly related to the line joining the points of location of the units 11 and 13. More particularly, the transmitting units 11, 12 and 13 are preferably positioned at the apexes of an approximately equilateral triangle (Fig. 2) and the area in which survey information is desired includes both the area enclosed by the lines interconnecting the points of location of the three units and those areas adjacent to these lines beyond the triangular configuration. As is described more fully hereinafter, the transmitting units 11, 12 and 13 are equipped sequentially to radiate position indicating signals in the form of carrier waves of different frequencies and switch control signals and reference signals in the form of modulated carrier waves of identical frequency but having different modulation components.

Specifically, the transmitting unit 11 comprises a continuously operative transmitter 15 and a control switch 16 for sequentially rendering the transmitter 15 operative through control connections 15b during spaced intervals to transmit carrier waves of 1800.000 kilocycles and 1700.000 kilocycles. The transmitter of the transmitting unit 11 also includes a modulator 17 for applying, through signal connections 15c from the switch 16, suitable modulation components to the output carrier wave radiated by the transmitter 15 during certain periods of operation in a manner which will become fully evident as the description proceeds. Similarly, the transmitting unit 12 includes a transmitter 18 and a control switch 19 for sequentially rendering the transmitter 18 operative through control connections 18b to radiate carrier waves at frequencies of 1800.000 kilocycles and 1700.250 kilocycles. The transmitting unit 12 also includes a modulator 20 for impressing through signal connections 18c from the switch 19, suitable modulation components upon the output wave radiated by the transmitter of the unit 12 during preselected periods of operation, as described more fully below. Similarly, the transmitting unit 13 comprises a continuously operative transmitter 21 and a control switch 22 for sequentially rendering the transmitter 21 operative through control connections 21b to radiate carrier waves at frequencies of 1800.000 kilocycles and 1700.700 kilocycles. The transmitting unit 13 also includes a modulator 23 for applying through signal connections 21c from the switch 22 suitable modulation components to the carrier wave output of the transmitter 21 at appropriate times, as will subsequently be described in detail.

As indicated above, the carrier frequencies at which the three transmitters of the transmitting units 11, 12 and 13 operate fall into two groups, one group consisting of three carrier waves of different frequency and the other group consisting of carrier waves of identical 1800.000 kilocycle frequency. Preferably, the frequencies assigned to the individual carrier waves are such that the frequencies of each group are well within a single channel allocation of 10 kilocycles as specified by the Federal Communications Commission of the United States government. It will be noted that the frequency of the first group of carrier waves generated by these three transmitters is separated in the frequency spectrum by approximately 100 kilocycles from the frequencies of the second carrier waves radiated by the three transmitters, thereby facilitating selective reception of these waves in the manner more fully explained below. The power of the three transmitters 15, 18 and 21 is such that the entire area in which position information may be desired at the receiving unit 14 is blanketed with waves radiated from each of the three transmitters and these waves have a field strength at all points within this area sufficient to permit reliable reception without requiring undue sensitivity of the receiving equipment.

In order to obviate the above mentioned difficulties attendant with phase synchronization of the position indicating carrier waves radiated by the three transmitters while at the same time eliminating the necessity for utilizing additional frequency channels, means are provided at the transmitting units 11, 12 and 13 for sequentially modulating the waves radiated by the transmitters of these units with reference signals representative of the difference frequencies between the carrier wave pairs. These reference signals may be received at any receiving point as, for example, at the mobile receiving unit 14 within the radius of transmission of the three transmitters. The equipment for this purpose as provided at the transmitting unit 11 comprises a fixed tuned amplitude modulation receiver 24 center tuned to a frequency of 1700.475 kilocycles and selective to the 1700.250 and 1700.700 kilocycle carrier waves respectively radiated by the transmitters 18 and 21. The selectivity of this receiver is obviously such that the 1800.000 kilocycle carrier waves radiated by the transmitters 15, 18 and 21 are rejected. The beat frequency of 450 cycles between the two carriers accepted by the radio frequency section of the receiver 24 is reproduced in the audio frequency section of this receiver and delivered through the control switch 16 and the signal connections 15c to the modulator 17 for amplitude modulation on the 1800.000 kilocycle carrier wave output radiated during this particular interval of operation by the transmitter 15 of the unit 11. To insure that only the desired 450 cycle signal will be passed to the modulator 17, the output of the receiver 24 is passed to the switch 16 through a narrow band pass filter 25 center tuned to a frequency of 450 cycles. Similarly, the transmitting unit 12 is equipped with a fixed tuned amplitude modulation receiver 26 center tuned to a carrier frequency of 1700.350 kilocycles and selective to the 1700.000 and 1700.700 kilocycle carrier waves respectively radiated by the transmitters 15 and 21. Here again, the receiver 26 has sufficient selectivity to reject the 1800.000 kilocycle carrier waves radiated by the transmitters 15, 18 and 21. The beat frequency of 700 cycles between the two carrier waves accepted by the receiver 26 is reproduced in the audio frequency section thereof and passed through a narrow band pass filter 27 which is center tuned to a frequency of 700 cycles. The 700 cycle output of the filter 27 is delivered through suitable contacts of the control switch 19 and the signal connections 18c to the modulator 20 for amplitude modulation upon the 1800.000 kilocycle carrier wave radiated by the transmitter 18 of the unit 12. In like manner the transmitting unit 13 includes a fixed tuned amplitude modulation receiver 28 which is center tuned to a frequency of 1700.125 kilocycles and is selective to the 1700.000 and 1700.250 kilocycle carrier waves respectively radiated by the transmitters 15 and 18. The selectivity of the receiver 28 is sufficient to enable the radio frequency section of this receiver to reject the 1800.000 kilocycle carrier waves radiated by the transmitters 15, 18 and 21. The 250 cycle beat frequency between the two carrier waves accepted by the receiver 28 is reproduced in the audio frequency section of this receiver and applied to a narrow band pass filter 29 which is center tuned to a frequency of 250 cycles. The output of the filter 29 is delivered through appropriate contacts of the control switch 22 and the signal connections 21c to the modulator 23 for amplitude modulation upon the 1800.000 kilocycle carrier wave radiated by the transmitter 21 of the unit 13.

To provide a means for sequentially operating the transmitters 11, 12 and 13 and for insuring that the modulation signals are applied only to the 1800.000 kilocycle waves radiated by the transmitters 15, 18 and 21, the transmitting unit 11 includes a fixed tuned amplitude modulation receiver 30 center tuned to a frequency of 1800.000 kilocycles and sharply selective to the 1800.000 kilocycle modulated waves radiated by the transmitters 18 and 21. The modulation components on the carrier waves accepted by the receiver 30 are reproduced at its output and applied to a narrow band pass filter 31 which is center tuned to a frequency of 250 cycles. The filter 31 rejects all of the modulation signals except the 250 cycle modulation component appearing on the 1800.000 kilocycle carrier wave output of the transmitter 21 and this modulation component is applied from the output of the filter 31 to a delay circuit 32. The signal received from the output of the filter 31 may be delayed for any desired interval by the delay circuit 32 before application to the control switch 16. Preferably the component arrangement of the delay circuit 32 is such that a delay equal in time to one-third of the duration of the complete cycle of operation of the three transmitting units 11, 12 and 13, as hereinafter described, is provided. If the complete cycle of operation is equal to one second, then the delay interval is equal to one-third second and at the end of this one-third second delay period, the switch 16 is energized to change the output frequency of the transmitter 15 from 1700.000 kilocycles to 1800.000 kilocycles. Energization of the control switch 16 in addition to switching the transmitter frequency renders the receiver 30 inoperative through control connections 30b and at the same time renders the receiver 24 operative through control connections 24b, thereby insuring that the receiver 30 will not be blocked by the 1800.000 kilocycle carrier wave radiation from the transmitter 15 so that this receiver may be rendered immediately effective when desired.

One type of control switch for effecting the results indicated above is illustrated in Fig. 5 in which the signal output from the delay circuit 32 is applied to the energizing coil 16a of switch 16c, the movable contact 16b of which is shown in its normal position for applying anode potential from the positive terminal 16e to the transmitter 15 through the control conductor 15b in order to provide for the transmission of 1700.000 kilocycle carrier wave signals. The switch 16c in the position shown also applies anode potential through the signal connection 30b to the receiver 30 thereby placing this receiver in operation whenever the transmitter 15 is operative to radiate the 1700.000 kilocycle carrier wave. When the control coil 16a is energized by the signal delivered from the delay circuit 32, the movable contact 16b is moved upwardly from the position shown to contact stationary contact 16d of switch 16c. The upward movement of the movable contact 16b breaks the anode circuit interconnecting the positive terminal 16e and the conductor 15b thereby terminating the radiation of the 1700.000 kilocycle carrier wave by the transmitter 15 and at the same time ceases the delivery of anode control voltage from the positive terminal 16e through the control connector 30b to the receiver 30. As soon as the movable contact 16b moves into contact with the stationary contact 16d, anode potential is delivered from the positive terminal 16e through the contact 16d of the switch 16c to the positive conductor 24b for initiating operation of the receiver 24. Thus the receiver 24 is rendered operative when the control switch 16c is energized and the receiver 30 is rendered inoperative by such energization. As will become evident from the ensuing description the receiver 24 heterodynes the carrier waves of 1700.250 and 1700.700 kilocycles and reproduces a 450 cycle beat frequency signal at its output terminals which is applied through the band pass filter 25 to control coil 16g of the switch 16n. The coil 16g controls a plurality of movable contacts 16h, 16k and 16p which are shown in their normally open circuit position so as to prevent the operation of the transmitter 15 at a frequency of 1800.000 kilocycles and to prevent the delivery of modulation signals to the modulator 17. When the 450 cycle signal from the receiver 24 energizes the coil 16g, the movable contacts 16h, 16k and 16p are moved into contact with the stationary contacts 16j, 16m and 16r, respectively. With the coil 16a of switch 16c and coil 16g of switch 16n both energized, anode current is delivered from the positive terminal 16e through the closed contacts of switches 16c and 16n to stationary contact 16j and through conductor 16i to the transmitter 15 which then begins to radiate a carrier wave signal at a frequency of 1800.000 kilocycles. Simultaneously with the radiation of an 1800.000 kilocycle carrier wave by transmitter 15, the 450 cycle signal from the band pass filter 25 is applied through the closed contacts of the switch 16n to stationary contact 16m and from there, through the control connections 15c to the modulator 17 for amplitude modulation upon the 1800.000 kilocycle carrier wave radiated by the transmitter 15. The alternate operation of the receivers 24 and 30 may be effected by means of a conventional transmit-receive circuit employing diodes to effectively make and break the antenna circuits to the receivers, or alternatively, as shown in Fig. 5, these receivers may be maintained in standby condition so that the switch 16 alternately makes and breaks the positive conducting bus for delivering anode current to the electron discharge tubes of these receivers.

To provide a means for maintaining the coil 16a in its energized condition after the pulse signal from the delay circuit 32 has terminated, the contacts 16p and 16r are encircuited through control connections 16s and 16t in series with a suitable source of potential 16q and the control coil 16a. Since the signal from the delay circuit 32 is a pulse of relatively short duration, the control coil 16a is energized by this signal only for a period of time equal to the pulse length. However, the pulse output of the delay circuit energizes the receiver 24 which in turn supplies a signal through filter 25 to energize control coil 16g. When the latter coil closes all of its contacts, the potential from the source 16q is impressed through contacts 16p and 16r and connectors 16s and 16t across the coil 16a, a condition which will exist as long as the coil 16g remains energized. The contacts 16p and 16r, therefore, complete a holding circuit for maintaining the coil 16a in its energized condition throughout the interval when the receiver 24 is in operation.

The elements just described and represented by the solid line components of Fig. 5 are included at each of the control switches 16, 19, and 22. The circuit components represented by the dotted lines in Fig. 5 constitute a starting circuit for initiating sequential operation of the transmitting units although these components are actually included in the control switch of only one of the three units, for instance, at the switch 22 of the unit 13. The starting circuit includes a switch 22a adapted to be controlled by the coil 16g of the switch 22 and connected in series circuit with a source of potential 22b and a time delay relay 22c, the source of potential 16q being connected to suitable contacts of the time delay relay in series with the control coil 16a of the switch 22. The switch 22a is shown in Fig. 5 in its normally closed position in which the potential of the source 22b is applied to the delay circuit 22c through closed contacts 22d and 22e of the switch 22a and through control connectors 22f and 22g. It will be understood that the switch 22a occupies its normally closed position only when the control coil 16a of the switch 22 is de-energized at which time the transmitter 21 of the unit 13 is operating to radiate a 1700.700 kilocycle carrier wave. Therefore, as soon as the transmitter 21 is rendered operative to radiate a 1700.700 kilocycle carrier wave, the switch 22a initiates operation of the time delay relay 22c. The delay period for this relay may be of any desired duration but is preferably longer than one complete cycle of operation of the transmitting units 11, 12 and 13. For the purposes of illustration a three second delay period will be assumed between application of pulses to the input of the delay circuit 22c and the closure of suitable contacts connected across the control connectors 22h and 22i. If the switch 22a remains closed for three full seconds, a condition which will exist only if the transmitter 21 remains operative to radiate a 1700.700 kilocycle carrier wave for three seconds, the time delay relay 22c will be energized and the voltage from the source of potential 16q will be impressed upon the control coil 16a through connectors 22h and 22i and through the closed contacts of the time delay circuit 22c. Energization of the coil 16a moves the contact 16b from the position shown into contact with fixed contact 16d thereby terminating radiation of the transmitter 21 at a frequency of 1700.700 kilocycles. Since the transmitters 15 and 18 at the units 11 and 12 are normally operative to radiate carrier waves at frequencies of 1700.000 and 1700.250 kilocycles, respectively, the signal from the band pass filter 29 will initiate the normal switching sequence by energizing coil 16g of the control switch 22. Energization of coil 16g moves the contact 16p from the position shown to break the circuit to the time delay relay 22c thus opening its contacts and breaking the circuit interconnecting the connectors 22h and 22i. The control coil 16a will then be controlled by the signals from the delay circuit 38 at the unit 13 and by the operation of the control coil 16g to make and break the series circuit including the source of potential 16q, the coil 16a, and the switch contacts 16p and 16r. Whenever the control coil 16g is energized the contact between contacts 22d and 22e is broken and the time delay relay 22c is reset to zero thereby assuring that the operation of the system will be stable as long as the proper switching sequence continues.

It will be understood that normally the transmitter 21 is operative to radiate a 1700.700 kilocycle carrier wave for only two-thirds of a complete cycle of operation and that, therefore, continuous operation of this transmitter at that frequency for a period in excess of two-thirds of a second would indicate that the transmitters 15 and 18 were radiating carrier waves of 1700.000 and 1700.250 kilocycles, respectively. With all three of the transmitters operating on a frequency in the 1700 kilocycle group sequential operation of the transmitting units cannot be attained due to the fact that the control swiches will not be operated until the energization of the time delay circuit 22c. An alernative means for insuring that the transmitter 21 at the unit 13 is switched from 1700.700 kilocycles to 1800.000 kilocycles is shown in Fig. 5 in which a push button start switch 22s is connected in series with the control coil 16a and the source of potential 16q in order to energize the coil when the push button is operated. Energization of the coil 16a by manual actuation of switch 22s effects the results indicated above in terminating radiation of transmitter 21 at 1700.700 kilocycles and placing the control switch 22 in condition for actuation by the signals from the band pass filter 29.

To provide a means for sequentially changing the output frequency of the transmitter 18 from 1700.250 kilocycles to 1800.000 kilocycles, the transmitting unit 12 includes a fixed tuned amplitude modulation receiver 33 center tuned to a frequency of 1800.000 kilocycles and which is selective to the modulated carrier waves of 1800.000 kilocycles radiated by the transmitters 15 and 21. All of the modulation components developed at the output of receiver 33 are rejected by a band pass filter 34 except for the 450 cycle modulation component appearing upon the 1800.000 carrier wave output of the transmitter 15. The 450 cycle signal appearing at the output of the receiver 33 is passed by the filter 34 to the delay circuit 35 which delays the application of this signal to the switch 19 for an interval of time equal to one-third of the complete cycle of operation. Preferably the delay introduced by the circuit 35 will be set at one-third second, at the end of which the 450 cycle signal will operate the switch 19 and through the control connections 18b change the output frequency of the transmitter 18 from 1700.250 kilocycles to 1800.000 kilocycles. The switch 19, which may be identical to the control switch 16 shown in Fig. 5, also renders the receiver 33 inoperative through the control connections 33b and renders the receiver 26 operative through the control connections 26b, thereby insuring that the receiver 33 will not be blocked by the 1800.000 kilocycle carrier wave radiation from the transmitter 18. Similar equipment is provided at the transmitting unit 13 for rendering the transmitter 21 operative to radiate an 1800.000 kilocycle carrier wave at appropriate intervals. This latter equipment includes a fixed tuned amplitude modulation receiver 36 center tuned to a frequency of 1800.000 kilocycles and which is selective to the 1800.000 kilocycle modulated carrier wave outputs of the transmitters 15 and 18. The modulation signals impressed on the 1800.000 kilocycle carrier waves radiated by the transmitters 15 and 18 are developed at the output of the receiver 36 and applied to a narrow band pass filter 37 which is center tuned to a frequency of 700 cycles. The 700 cycle signal modulated upon the carrier wave output of the transmitter 18 is passed by the filter 37 to the delay network 38 where the application of this signal to the switch 22 is delayed for an interval of time equal to one-third of a complete cycle of operation. At the end of this one-third cycle delay period, the switch 22 is energized and the output frequency of the transmitter 21 is changed through the control connections 21b from 1700.700 kilocycles to 1800.000 kilocycles. At the same time the switch 22 renders the receiver 36 inoperative through the control connections 36b and the receiver 28 is rendered operative through control connections 28b thereby preventing the 1800.000 kilocycle carrier wave radiation from the transmitter 21 from blocking the receiver 36. The switch 22 may be identical to the control switch 16 shown in Figure 5 except that the switch 22 also includes the component elements shown in dotted lines and may also include a push button start switch 22s indicated by dotted lines and interconnecting the positive anode source 16q and the operating coil 16a of the switch 16c. As will subsequently become evident, the purpose of the start switch 22s is to initiate the operation of the transmitting units 11, 12 and 13 in the proper sequence of operation.

Referring now particularly to the equipment constituting the mobile receiving unit 14, this equipment comprises a fixed tuned amplitude modulation receiver 39, a second fixed tuned amplitude modulation receiver 40, three phase angle meters 41, 42 and 43, a pair of narrow band pass filters 44 and 45 center tuned to a frequency of 250 cycles, a pair of narrow band pass filters 46 and 47 center tuned to a frequency of 450 cycles and a pair of narrow band pass filters 48 and 49 center tuned to a frequency of 700 cycles. The receiver 39 is fixed tuned to a carrier frequency of 1700.350 kilocycles and is designed to accept the second carrier wave radiated by each of the transmitters 15, 18 and 21 and to reject the first carrier wave radiated by these transmitters. The filters 44, 46 and 48 which may be of any standard commercial construction perform the function of selecting the heterodyne or difference frequency signals developed at the output of the receiver 39 and delivering these signals to the phase meters 41, 42 and 43, respectively. Similarly the filters 45, 47 and 49 perform the function of selecting the proper one of the reference signals or modulation components developed at the output of the receiver 40 and delivering these signals to the phase meters 41, 42 and 43, respectively. Each of the phase meters 41, 42 and 43 is equipped with a rotor carrying thereon an element which indexes with a circular scale to indicate the phase relationship between the two impressed voltages. If desired, each meter may also be equipped with a revolution counter mechanically driven from the rotor element of the meter to count the isophase lines traversed by the mobile receiving unit 14 during movement of the craft carrying this unit.

In considering the operation of the above described position-determining system it will be first assumed that the control switches 16 and 19 are in their normally deenergized condition, that the transmitter 15 of the transmitting unit 11 is operative to radiate its second carrier wave of 1700.000 kilocycles and that the transmitter 18 of the transmitting unit 12 is operative to radiate its second carrier wave of 1700.250 kilocycles. When the push button switch 22s at the unit 13 is manually depressed or when the time delay relay 22c is energized, depending upon the particular means selected for starting the switching sequence, anode potential is delivered to appropriate electron discharge tubes of the transmitter 21 to render the latter operative to radiate an 1800.000 kilocycle carrier wave as soon as a signal is applied to the control coil 16g of the switch 22 from the band pass filter 29. With the transmitters 15 and 18 in operation, the receiver 28 at the transmitting unit 13 is excited by the two radiated carrier waves indicated by solid line arrows and the 250 cycle difference frequency therebetween is produced at its output terminals. The 250 cycle beat frequency signal is passed by the band pass filter 29 to operate the switch 22 and render the transmitter 21 effective to radiate an 1800.000 kilocycle carrier wave. The 250 cycle output of the filter 29 is also delivered to the modulator 23 for amplitude modulation upon the carrier wave of 1800.000 kilocycle radiated by the transmitter 21. This modulated signal is received by the receiver 40 at the mobile receiving unit 14 as likewise indicated by the solid line arrow and the 250 cycle modulation component is reproduced at the output terminals of this receiver. At the same time the modulated carrier wave output from the transmitter 21 is received by the receiver 30 at the unit 11 and the 250 cycle modulation frequency is applied through the band pass filter 31 to the delay circuit 32. It will be understood that the modulated carrier wave output of the transmitter 21 is also detected by the receiver 33 at the unit 12, but the filter 34 rejects the 250 cycle modulation frequency and prevents this signal from being applied to the delay circuit 35. As will subsequently appear evident, the push-button switch 22s may be released at any time after the switching operation commences without affecting the operation of the equipment, for thereafter the holding circuit which includes the contacts 16p and 16r will keep the coil 16a energized as long as a signal is received from the band pass filter 29 and the system will therefore be self-sustaining.

During the period when the transmitter 21 is radiating a modulated carrier wave of 1800.000 kilocycles, the receiver 39 at the mobile receiving unit 14 is energized by the carrier waves radiated by the transmitter 15 and the transmitter 18 having frequencies of 1700.000 and 1700.250 kilocycles, respectively. The 250 cycle beat frequency or heterodyne signal resulting from heterodyning the two carrier waves accepted by the receiver 39 is reproduced at its output terminals and applied through the band pass filter 44 to the right hand set of input terminals of the phase meter 41. The filters 46 and 48 reject the 250 cycle beat frequency signal developed and prevent its application to the phase meters 42 and 43. The 250 cycle modulation component developed at the output of the receiver 40 is applied through the band pass filter 45 to the left hand set of input terminals of the phase meter 41 to serve as a reference signal for phase comparison with the 250 cycle heterodyne signal applied to the right hand set of input terminals of this phase meter. The filters 47 and 49 reject the 250 cycle reference signal output of the receiver 40 and prevent this signal from exciting the phase meters 42 and 43. The phase meter 41, therefore, has applied to its opposite sets of input terminals two signal voltages of identical frequency with the result that this phase meter measures the phase angle between the applied signals. This phase angle indication is accurately representative of the position of the mobile receiving unit between two isophase lines of the standing waves produced in space as a result of the carrier wave radiation by the transmitters 15 and 18 at frequencies of 1700.000 and 1700.250 kilocycles, respectively.

The above described operation of the transmitting and receiving equipment continues until the 250 cycle signal applied to the delay circuit 32 is passed to the switch 16. As soon as the switch 16 is energized, the 1700.000 kilocycle carrier wave radiation by the transmitter 15 is terminated and the heterodyne functions taking place at the receivers 28 and 39 are likewise arrested. The 250 cycle signal supplied to the switch 22 from the receiver 28 is immediately interrupted thus returning the switch to its normal position thereby terminating the radiation of 1800.000 kilocycle carrier wave signals from the transmitter 21 and placing this transmitter in operation to radiate a carrier wave signal at a frequency of 1700.700 kilocycles. This operation of the switch 22 is also effective to render the receiver 28 inoperative and the receiver 36 operative, thereby assuring that the receiver 28 will not be blocked by the 1700.700 kilocycle carrier wave radiation from the transmitter 21. With the transmitter 21 no longer operative to radiate a modulated 1800.000 kilocycle carrier wave output, the receiver 40 no longer reproduces the modulation component of 250 cycles across its output terminals. At the same time the receiver 39 is prevented from producing a heterodyne signal at its output terminals due to the absence of the 1700.000 kilocycle carrier wave from the transmitting unit 11. The phase meter 41 is thus rendered ineffective further to change the setting of its indicating element.

When the switch 16 at the transmitting unit 11 is operated by the signal from the delay circuit 32, the receiver 24 is rendered effective to receive carrier wave radiations and the receiver 30 is rendered ineffective to receive such signals thereby preventing the receiver 30 from being blocked when the output frequency of the transmitter 15 is switched from 1700.000 kilocycles to 1800.000 kilocycles. At the end of the first interval therefore the transmitter 18 of the unit 12 continues to radiate a carrier wave signal of 1700.250 kilocycles and the transmitter 21 is immediately rendered effective to radiate a carrier wave signal of 1700.700 kilocycles. These two carrier waves are accepted by the receiver 24 at the unit 11 and the difference frequency of 450 cycles appears at its output terminals. This 450 cycle beat frequency signal is applied through the filter 25 thereby operating the control switch 16 in order to render the transmitter 15 effective to radiate an 1800.000 kilocycle carrier wave and the 450 cycle signal is also supplied through the closed contacts of the control switch 16 to the modulator 17 for amplitude modulation upon the 1800.000 kilocycle carrier wave output of the transmitter 15. The modulated carrier wave thus radiated is received by the receiver 40 and the 450 cycle modulation component is reproduced at the output terminals of the receiver. Simultaneously therewith the modulated carrier wave radiated by the transmitter 15 during the second interval is received by the receiver 33 at the unit 12 and the 450 cycle modulation component is detected by this receiver. The output of the receiver 33 is applied through the band pass filter 34 to the delay circuit 35 where it is ineffective to produce any change in the operating condition of the transmitting unit 12 until the expiration of the delay period of one-third second. The modulated carrier wave output of the transmitter 15 is also received and detected by the receiver 36 but the band pass filter 37 prevents the 450 cycle modulation component from being effective to change operating conditions at the transmitting unit 13.

The receiver 39 at the receiving unit 14 is excited by the 1700.250 kilocycle and 1700.700 kilocycle carrier waves radiated by the transmitters 18 and 21 during the second interval. The two carrier waves accepted by the receiver 39 are heterodyned to produce a beat frequency or difference frequency signal of 450 cycles which is applied through the band pass filter 46 to the right hand set of input terminals of the phase meter 42. The filters 44 and 48 reject the 450 cycle heterodyne signal appearing at the output of the receiver 39 during the second interval and therefore render the phase meters 41 and 43 ineffective to change their indicator settings during this interval. The 450 cycle modulation component appearing at the output of the receiver 40 as a result of the reception of the modulated carrier wave output from the transmitter 15 is applied through the band pass filter 47 to the left hand set of input terminals of the phase meter 42. The filters 45 and 49 prevent the application of this reference signal to the input terminals of the phase meters 41 and 43. Thus two signal voltages of identical frequency are applied to the two sets of input terminals of the phase meter 42 with the result that this meter registers the phase angle between the applied signals. This phase angle indication is accurately representative of the position of the mobile receiving unit 14 between two isophase lines of the standing waves produced in space as a result of the carrier wave radiation by the transmitters 18 and 21 at frequencies of 1700.250 kilocycles and 1700.700 kilocycles, respectively.

The above described operation continues throughout the second interval of operation and is terminated by the application of the 450 cycle signal output of the receiver 33 to the switch 19 after the expiration of the one-third second time delay in the delay circuit 35. Energization of the switch 19 terminates the operation of the transmitter 18 at 1700.250 kilocycles, renders the receiver 33 ineffective to receive carrier wave radiations and places the receiver 26 in operation thereby preventing the subsequent 1800.000 kilocycle carrier wave output of the transmitter 18 from blocking the receiver 33. The cessation of the 1700.250 kilocycle carrier wave radiated by the transmitter 18 terminates the heterodyne action occuring at the receiver 39 and at the receiver 24. The interruption of output signals from the receiver 24 halts the application of energizing signals to the switch 16 with the result that this switch returns to its normal position and the output frequency of the transmitter 15 is changed from 1800.000 kilocycles to 1700.000 kilocycles. When the switch 16 thus returns to its normal position the receiver 30 is rendered operative and the receiver 24 is rendered inoperative, thus assuring that this latter receiver will not be blocked by the 1700.000 kilocycle carrier wave radiation by the transmitter 15.

When the 1700.250 kilocycle carrier wave radiation by the transmitter 18 is interrupted by energization of the switch 19, the receiver 39 no longer produces a 450 cycle beat frequency at its output terminals. Excitation signals for the phase meter 42 are therefore terminated, thus rendering this meter ineffective further to change its indicator setting. Thus at the end of the second interval the transmitter 21 continues to radiate a 1700.700 kilocycle carrier wave and the transmitter 15 is immediately rendered effective to radiate a 1700.000 kilocycle carrier wave. These two carrier waves are both accepted by the receiver 26 at the transmitting unit 12 and the 700 cycle beat frequency or heterodyne signal therebetween is reproduced at the output terminals of the receiver. This 700 cycle signal is applied through the band pass filter 27 to further operate the switch 19 and render the transmitter 18 effective to radiate an 1800.000 kilocycle carrier wave and the 700 cycle signal is also supplied through the closed contacts of the switch 19 to the modulator 20 for amplitude modulation upon the 1800.000 kilocycle carrier wave output of the transmitter 18 for use as a reference signal. The modulated carrier wave signal thus radiated is received by the receiver 40 at the mobile receiving unit 14 and the 700 cycle modulation signal is detected and reproduced across the output terminals of the receiver. The modulated carrier wave output of the transmitter 18 is also received by the receiver 36 and the 700 cycle modulation signal is similarly detected and reproduced at the output terminals of this receiver. The 700 cycle output signal of the receiver 36 is applied through the band pass filter 37 to initiate operation of the delay circuit 38 which for a one-third second time delay period prevents this 700 cycle signal from altering the operating conditions at the transmitting unit 13. The modulated carrier wave output of the transmitter 18 is also received by the receiver 30 but the 700 cycle modulation signal developed across the output terminals of this receiver is rejected by the band pass filter 31 and is thereby rendered ineffective to change the operating conditions existing at the transmitting unit 11.

The recevier 39 at the mobile receiving unit 14 accepts both of the carrier waves radiated by the transmitters 15 and 21 during the third interval. These signals, having frequencies of 1700.000 kilocycles and 1700.700 kilocycles, respectively, are heterodyned in the radio frequency section of the receiver 39 and the 700 cycle beat frequency or heterodyne signal therebetween is reproduced at the output terminals of the receiver. The 700 cycle difference frequency signal is applied through the band pass filter 48 to the right hand set of input terminals of the phase meter 43, the filters 44 and 46 functioning to prevent the application of this signal to the phase meters 41 and 42, respectively. The 700 cycle modulation component produced at the output terminals of the receiver 40 as a result of the reception of the modulated carrier wave radiated by the transmitter 18 during the third interval is applied through the band pass filter 49 to the left hand set of input terminals of the phase meter 43, the filters 45 and 47 functioning to reject this signal. Thus, two signal voltages of identical frequency are applied to the opposite sets of input terminals of the phase meter 43 with the result that this meter functions to measure the phase angle between the two applied signals. This phase angle indication is accurately representative of the position of the mobile receiving unit 14 between two adjacent isophase lines of the standing waves produced in space as a result of carrier wave radiation by the transmitters 15 and 21 at frequencies of 1700.000 kilocycles and 1700.700 kilocycles, respectively.

The above described operation continues throughout the third one-third second interval, at the end of which the 700 cycle output signal from the delay circuit 38 is applied to the switch 22. The switch 22 immediately terminates the output of the transmitter 21 at 1700.700 kilocycles and at the same time renders the receiver 36 inoperative and the receiver 28 operative. When the carrier wave radiation at a frequency of 1700.700 kilocycles from the transmitter 21 is terminated, the heterodyne action occurring at the receiver 39 and at the receiver 26 is interrupted. The switch 19 is no longer actuated by the signal output of the band pass filter 27 and, therefore, this switch returns to its normal position and the output frequency of the transmitter 18 is converted from an 1800.000 kilocycle carrier wave to a 1700.250 kilocycle carrier wave. When the switch 19 is restored to its normal position, the receiver 33 is rendered operative and the receiver 26 is rendered inoperative. The interruption of the heterodyne action at the receiver 39 and the interruption of the 700 cycle modulation component being developed at the output of the receiver 40 halts the application of energizing signals to the input terminals of the phase meter 43 with the result that this phase meter is rendered ineffective to further change the setting of its indicating element. At the end of the third interval therefore the transmitter 15 is operating to radiate a carrier wave at a frequency of 1700.000 kilocycles and the switch 19 immediately renders the transmitter 18 operative to radiate a 1700.250 carrier wave. With the transmitters 15 and 18 again in operation at these frequencies, the receiver 28 is again excited by carrier waves having a difference frequency therebetween of 250 cycles. The 250 cycle beat frequency or heterodyne signal between the two carrier waves accepted by the receiver 28 functions to energize the switch 22 and to reinitiate the operation of the transmitter 21 at a frequency of 1800.000 kilocycles. With the transmitter 21 in operation to radiate a carrier wave of 1800.000 kilocycles having a modulation component thereon of 250 cycles, another complete cycle of operation is commenced with the results indicated above.

From the foregoing explanation it will be understood that the transmitters 15, 18 and 21 in their alternate operation to radiate pairs of carrier waves of different frequencies cooperate with the receivers 24, 26 and 28 successively to render the transmitters 15, 18 and 21 operative to radiate reference signals modulated upon an 1800.000 kilocycle carrier wave. More particularly, each of the transmitters 15, 18 and 21 is operative to radiate position indicating carrier waves during two-thirds of a complete cycle of operation and is operative during the remaining one-third of operation to radiate a reference signal in the form of an 1800.000 kilocycle modulated carrier wave. The position indicating carrier waves radiated by the three transmitters 15, 18 and 21 are of different frequencies, whereas the carrier waves having impressed thereon the modulation or reference signals are of identical frequency. The modulated carrier wave radiated from each of the transmitting units, in addition to its function as a reference signal for phase comparison at the mobile receiving unit 14, also serves as an energizing signal for providing the proper sequence of operation of the transmitting units 11, 12 and 13.

From a consideration of the above explanation it will be understood that the receiver 39 functions as a heterodyne receiver for developing different heterodyne or difference frequency signals during the three intervals when respective pairs of the transmitters 15, 18 and 21 are operative to radiate position indicating carrier waves. The receiver 40 functions as a reference signal detecting receiver with respect to the modulated carrier waves radiated by the transmitters 15, 18 and 21 during the intervals when these transmitters are radiating modulated carrier waves of 1800.000 kilocycles. It will be evident from the above explanation that the phase meter 41 functions to produce a phase angle indication representative of the position of the mobile receiving unit 14 between two isophase lines of the standing waves produced in space as a result of carrier wave radiation by the transmitters 15 and 18 when these transmitters are simultaneously operating to radiate position indicating signals. With the described arrangement wherein carrier wave frequencies of 1700.000 kilocycles and 1700.250 kilocycles are employed, the wave length spacing between the isophase lines along a base line connecting the units 11 and 12 is determined by the means frequency of 1700.125 kilocycles between the two radiated carrier waves. At this particular mean frequency isophase lines representative of the same phase relationship between the standing waves produced by the transmitters 15 and 18 are spaced apart along the line joining the units 11 and 12 at a distance of about 289 feet. Hence, the indication provided by the phase meter 41 identifies the position of the receiving unit 14 within a zone not less than 289 feet in width, that is a zone having a minimum width equal to one-half the wave length of a wave having a frequency equal to the mean frequency of the position indicating carrier waves radiated by the transmitters 15 and 18. The distribution of the isophase lines produced in space by the radiations from the transmitters 15 and 18 is best shown in Fig. 2 in which these equiphase lines are represented by the dashed hyperbolic lines designated by the reference character 50.

As previously indicated, the indication provided by the phase meter 41 standing alone is ambiguous for the reason that this indication does not identify the point of location of the receiving unit 14 along the zone separating two adjacent isophase lines of the standing waves produced by the transmitters 15 and 18. Identification of this point is obtained through the response of the receiving unit to the position indicating signals radiated by the transmitter 15 and the transmitter 21 and to the position indicating signals radiated by the transmitter 18 and the transmitter 21. Thus the phase meter 42 provides an indication of the mobile receiving unit 14 between two adjacent isophase lines of the standing waves produced by the transmitters 18 and 21. Here again, the wave length spacing of equiphase lines along a base line connecting the two units 12 and 13 is determined by the mean frequency of 1700.475 kilocycles, between the frequencies of the waves radiated by the transmitters 18 and 21. At this particular mean frequency isophase lines representative of the same phase relationship between the standing waves produced by the two identified transmitters have a minimum spacing of approximately 288 feet, whereby the indication provided by the meter 42 identifies the position of the receiving unit 14 within a zone having a 288 foot minimum width. In like manner the phase meter 43 provided an indication of the position of the mobile receiving unit 14 between two adjacent isophase lines of the standing waves produced in space by carrier wave radiation of the transmitters 15 and 21. The spacing between these equiphase lines along a base line interconnecting the units 11 and 13 is likewise determined from the mean frequency between the two carrier waves radiated by the transmitters 15 and 21. These lines will again be spaced apart a distance of approximately 288 feet along the base line and the indication provided by the phase meter 43 therefore identifies the position of the mobile receiving unit 14 within a zone having a 288 foot minimum width. The isophase lines effectively produced in space as a result of carrier wave radiation from the transmitters 18 and 21 are represented in Fig. 2 by the solid hyperbolic lines and are designated by the reference character 51. The isophase lines effectively produced in space as a result of carrier wave radiation by the transmitters 15 and 21 are represented in Fig. 2 by alternate dash-dot lines and are designated by the reference character 52.

It can therefore be seen that the area enclosed by the lines interconnecting the transmitting units 11, 12 and 13 and the area adjacent to these linees but outside of the enclosed area are both blanketed with an intersecting hyperbolic pattern representative of the radiations of position indicating signals by the transmitting units 11, 12 and 13. The phase meters 41, 42 and 43 of the mobile receiving unit 14 thus provide a simultaneous indication of the position of the mobile receiving unit along three hyperbolic lines respectively representative of the standing waves radiated by the pairs of these transmitting units. Since the position obtained by a simultaneous reading of the three meters must result in a single point position determination and since, furthermore, there is only one point within a limited area where three hyperbolic lines, as represented by the phase meter indications, intersect at a common point, the above described system provides indications which are relatively free of ambiguity problems. The indicating element of each of the phase meters 41, 42 and 43 is mechanically connected to a revolution counter which registers the number of lanes through which the mobile receiving unit passes as the survey is being conducted. If one of the counters or lane indicators of the meters should lose a count due to transmitter failure, interference or other causes without the operator's knowledge, the position indicated by the phase meters would not be described by a concurrent intersection of three lines but would instead be defined by three separate and distinct intersections of any two of the three hyperbolas indicated on the phase meters. An analysis of the situation by the operator will allow him to determine which of the meters has lost a lane count and corrections may be introduced accordingly to the registering mechanism until a concurrent intersection of three hyperbolas is again achieved. The number of concurrent intersections which might occur within a given area is a function of the lane width, base line length, the angle between the base lines, and the accuracy of the phase measurement and, consequently, by the use of highly accurate phase meters and by positioning the equipment to obtain optimum results it is possible to limit the number of these intersections, thereby providing practically non-ambiguous position determinations over a relatively wide area.

It is apparent that the use of three simultaneous phase meter readings to produce a concurrent intersection of three hyperbolas does not afford a complete solution to the ambiguity problem when an extensive area is being surveyed, but in certain installations the position indications provided are entirely adequate. If, however, it becomes desirable to provide completely non-ambiguous position indications throughout the entire area the transmitting equipment shown in Fig. 1 may be altered to provide an additional transmitter and an additional receiver at each of the transmitting units 11, 12 and 13 as shown in Fig. 3. This alteration of the transmitting units necessitates a modification of the mobile receiving unit 14 shown in Fig. 1 to provide an additional receiver and three additional phase meters with their associated band pass filters and a pair of beat mixers as shown in Fig. 4.

In the ensuring description of the equipment constituting the transmitting and receiving units of the system shown in Figs. 3 and 4 reference characters which have been primed designate elements which correspond to or are identical with the component parts of the transmitting and receiving units of Fig. 1, whereas reference numerals having the letter "a" as a suffix designate equipment which has been added to the transmitting and receiving units of the system shown in Fig. 1. Hence, it is apparent that the transmitting unit 11' is identical to the transmitting unit 11 except for the addition of a transmitter 55a and a receiver 58a each connected to the control switch 16' through control connections 55b and 58b respectively so as to be rendered alternately operative and inoperative during appropriate intervals as will be described in detail hereinafter. In addition, the receiver 58a is connected to the control switch 16' through signal connections 58c so as to supply its output signals to the modulator 17'. Similarly, the transmitting unit 12' is identical to the transmitting unit 12 except for the addition of a transmitter 56a and a receiver 59a each connected to the control switch 19' through control connections 56b and 59b, respectively, so as to be rendered alternately operative and inoperative during certain periods of operation for purposes which will be appreciated as the description proceeds, and the receiver 59a is also connected to the control switch 19' through signal connections 59c so as to supply its output signals to the modulator 20'. In like manner the transmitting unit 13' is identical to the transmitting unit 13 except for the addition of a transmitter 57a and a receiver 60a which are respectively connected to the control switch 22' through control connections 57b and 60b so as to be rendered alternately operative and inoperative during spaced intervals of operation of the transmitting units 11', 12' and 13' in a manner which will become fully evident from the ensuing description and the receiver 60a is also connected to the control switch 22' through signal connections 60c so as to supply its output signals to the modulator 23'.

The transmitters 55a, 56a and 57a alternately radiate position indicating signals of different frequencies but the frequencies assigned to these transmitters are such that the individual carrier waves preferably fall within a frequency band which is considerably less than a ten kilocycle band allocation. To facilitate the selective reception of the waves radiated by the three additional transmitters 55a, 56a and 57a and the two carrier waves radiated by each of the transmitters 15', 18' and 21', the carrier frequencies of the three additional transmitters are preferably spaced approximately half way between the first group of carrier waves of different frequencies and the second group of carrier waves of identical frequency radiated by the transmitters 15', 18' and 21'. More specifically, the transmitter 55a of the unit 11' is designed to radiate a carrier wave of 1750.000 kilocycles when the transmitter 15' is operative to radiate a 1700.000 kilocycle carrier wave and is connected to suitable contacts of the switch 16' so as to be rendered inoperative when the transmitter 15' is radiating a modulated 1800.000 kilocycle carrier wave. Similarly the transmitter 56a of the unit 12' radiates a carrier wave of 1750.340 kilocycles during the intervals when the transmitter 18' is operative to radiate a carrier wave of 1700.250 kilocycles and is connected to the control switch 19' so as to be rendered inoperative during the interval when the transmitter 18' radiates a modulated 1800.000 kilocycle carrier wave. The transmitter 57a of the unit 13' is connected to the control switch 22' so as to be rendered operative to radiate a 1750.910 kilocycle carrier wave during the intervals when the transmitter 21' is operative to radiate a 1700.700 kilocycle carrier wave and to be rendered inoperative during the interval when the transmitter 21' is radiating a modulated 1800.000 kilocycle carrier wave. To facilitate the modulation of an additional reference signal upon the 1800.000 kilocycle carrier wave output of the transmitter 15' at the unit 11' the receiver 58a is center tuned to a frequency of 1750.625 kilocycles and is connected to the switch 16' through the control connections 58b and the signal connections 58c so that its output will be delivered to the modulator 17' when the transmitter 15' is radiating an 1800.000 kilocycle carrier wave. The receiver 58a is rendered inoperative by the control switch 16' through the control connections 58b when the transmitter 15' is radiating a 1700.000 kilocycle carrier wave whereby the receiver 58a will be in operation whenever the receiver 24' is operating and will be inoperative whenever the receiver 30' is operating.

The receiver 58a is selective to the carrier waves radiated by the transmitters 56a and 57a and rejects the carrier wave radiated by the transmitters 18' and 21' irrespective of the particular carrier wave being radiated by these units as determined by the position of their associated control switches.

The beat frequency of 570 cycles between the two carrier waves accepted by the receiver 58a is reproduced in the audio section of this receiver and applied through the signal connections 58c and suitable contacts of the control switch 16' to the modulator 17' only during the interval when the transmitter 15' is radiating an 1800.000 kilocycle carrier wave. The receiver 59a at the transmitting unit 12' is center tuned to a frequency of 1750.450 kilocycles and is designed to accept the carrier waves radiated by the transmitters 55a and 57a and to reject the carrier waves radiated by the transmitters 15' and 21' regardless of the output frequency of these latter transmitters. The beat frequency of 910 cycles between the carrier waves accepted by the receiver 59a is reproduced at its output terminals and applied through the signal connections 59c and suitable contacts of the control switch 19' to the modulator 20' during the interval when the transmitter 18' is operative to radiate an 1800.000 kilocycle carrier wave. Other contacts of the switch 19' render the receiver 59a inoperative through the connections 59b during the intervals when the transmitter 18' is radiating a 1700.250 kilocycle carrier wave, thereby providing for the operation of the receiver 59a during the periods when the receiver 26' is operative and preventing the operation of the receiver 59a during the periods when the receiver 33' is in operation. The receiver 60a at the unit 13' is center tuned to a frequency of 1750.170 kilocycles and is designed to accept the carrier waves radiated by the transmitters 55a and 56a and to reject both of the output frequencies of the transmitters 15' and 18'. The beat frequency of 340 cycles between the two carrier waves accepted by the receiver 60a is applied through the signal connections 60c and suitable contacts of the control switch 22' to the modulator 23' for amplitude modulation upon the carrier wave output 21' during the interval when this transmitter is radiating an 1800.000 kilocycle carrier wave. Other contacts of the switch 22' are effective through the control connections 60b to render the receiver 60a inoperative during the intervals when the transmitter 21' is radiating a 1700.700 kilocycle carrier wave, thus insuring that the receiver 60a will be inoperative during the intervals when the receiver 36' is operating and will be operative during the intervals when the receiver 28' is in operation.

Referring now to Fig. 4 for a description of the equipment constituting the mobile receiving unit 14', it is apparent that this equipment is identical with that of the mobile receiving unit 14 shown in Fig. 1 except for the addition of a fixed tuned amplitude modulation receiver 61a, a pair of beat mixers 62a and 63a, three additional phase meters 64a, 65a, 66a, a pair of band pass filters 67a and 68a center tuned to a frequency of 90 cycles, a pair of band pass filters 69a and 70a center tuned to a frequency of 120 cycles and a pair of band pass filters 71a and 72a center tuned to a frequency of 210 cycles. The receiver 61a is center tuned to a frequency of 1750.455 kilocycles and is designed to accept the carrier waves radiated by the transmitters 55a, 56a and 57a and to reject both of the carrier waves radiated by each of the transmitters 15', 18' and 21'. The beat mixer 62a heterodynes the output signal from the receiver 61a and the output of the receiver 39' in order to provide coarse indicating signals which are representative of the phantom frequencies or difference frequencies between the carrier waves heterodyned by the receivers 39' and 61a as will become evident as the description proceeds. The output of the beat mixer 62a is applied through the band pass filters 68a, 70a and 72a to one set of input terminals of the phase meters 64a, 65a and 66a, respectively. To provide a reference signal for phase comparison with the coarse signals appearing at the output of the beat mixer 62a the beat mixer 63a heterodynes the two reference signals of different frequencies simultaneously modulated upon the 1800.000 kilocycle carrier wave radiated successively by the transmitters 15', 18' and 21' as will be more fully described hereinafter. The difference frequency between any two of these simultaneously impressed reference signals appears at the output of the beat mixer 63a and is applied through the band pass filters 67a, 69a and 71a to the other set of input terminals of the phase meters 64a, 65a and 66a, respectively. The frequencies of the various signals produced at the output terminals of the receivers 39', 40' and 61a and at the output of the beat mixers 62a and 63a during the first interval of operation of the transmitting units 11', 12' and 13' are indicated in Fig. 4 at these output terminals by the frequencies associated with the reference character 1. Similarly, those signals appearing at the various output terminals during the second and third intervals of operation are indicated by the frequencies associated with the reference characters 2 and 3, respectively.

Considering now the operation of the system shown in Figs. 3 and 4, when the transmitters 15' and 18' are simultaneously operated to radiate position indicating signals in the form of carrier waves at frequencies of 1700.000 and 1700.250 kilocycles, respectively, the receiver 28' at the unit 13' will have applied thereto both of these carrier waves as indicated by the solid line arrows 72 and 73. The control switch 22' is at this time in position to cause the transmitter 21' to radiate an 1800.000 kilocycle carrier wave. The difference frequency of 250 cycles between the two carrier waves accepted by the receiver 28' is reproduced and applied to the modulator 23' through the band pass filter 29' and closed contacts of the switch 22' for amplitude modulation upon the carrier wave output of 1800.000 kilocycles radiated by the transmitter 21'. During this same interval the transmitters 55a and 56a are in operation to radiate carrier waves of 1750.000 and 1750.340 kilocycles, respectively. These two carrier waves as indicated by the solid line arrows 74 and 75 are accepted by the receiver 60a which has previously been placed in operation by the control switch 22'. The receiver 60a functions to heterodyne the two carrier waves accepted thereby and to apply the 340 cycle beat frequency signal thus developed through the closed contacts of the switch 22' to the modulator 23' for amplitude modulation upon the 1800.000 kilocycle carrier wave output of the transmitter 21'. Therefore, during this interval of operation the 1800.000 kilocycle carrier wave radiated by the transmitter 21' is simultaneously modulated by a 250 cycle signal from the receiver 28' and a 340 cycle signal from the receiver 60a. The modulated carrier wave output of the transmitter 21' is received by the receiver 30' at the unit 11' and by the receiver 40' at the mobile receiving unit 14' as indicated by the solid line arrows 76 and 77, respectively. The modulated carrier wave is also accepted by the receiver 33' at the unit 12' but both of the modulation components appearing on this wave are rejected by the band pass filter 34' thereby preventing the modulated signal from affecting the operating conditions existing at the transmitting unit 12'. The 250 cycle modulation component appearing on the carrier wave output of the transmitter 21' is reproduced by the receiver 30' and applied through the band pass filter 31' to the delay circuit 32'. It will be understood that the band pass filter 31' rejects the second modulation signal of 340 cycles which is impressed upon the 1800.000 kilocycle carrier wave radiated by the transmitter 21'. The circuit parameters of the delay circuit 32' are preferably such that a one-third cycle delay is introduced to the signals passed by the filter 31' before application to the control switch 16'. It will be understood that the receivers 58a, 59a, 24' and 26' are rendered inoperative during this interval of operation by the control switches 16' and 19'. Both of the modulation signals appearing on the 1800.000 kilocycle carrier wave radiated by the transmitter 21' are reproduced by the receiver 40' at the mobile receiving unit 14'. The 250 cycle modulation component is applied through the band pass filter 45' to the left hand set of input terminals of the phase meter 41' to serve as a reference signal for phase comparison with the position indicating signals radiated by the transmitters 15' and 18'. The 340 cycle modulation component appearing at the output of the receiver 40' is rejected by the filters 45', 47' and 49' but both this signal and the 250 cycle modulation signal are applied to the beat mixer 63a where they are heterodyned to produce a 90 cycle beat frequency. This 90 cycle signal is applied through the band pass filter 67a to the left hand set of input terminals of the phase meter 64a for phase comparison with a 90 cycle beat frequency signal produced by the mixer 62a as hereinafter described.

The filters 47', 49', 69a and 71a prevent the application of excitation signals to the left hand set of input terminals of the phase meters 42', 43', 65a and 66a during this interval of operation. The receiver 39' as indicated by the solid line arrows 78 and 79 accepts the carrier waves of 1700.000 and 1700.250 kilocycles respectively radiated by the transmitters 15' and 18' and reproduces at its output terminls a 250 cycle beat frequency signal. This signal is applied to the beat mixer 62a where it is heterodyned with a 340 cycle beat frequency signal which results from a heterodyning at the receiver 61a of the carrier waves indicated by the solid line arrows 80 and 81 radiated by the transmitters 55a and 56a. The 90 cycle difference frequency signal between the two beat frequencies applied to the beat mixer 62a is reproduced at the output of the beat mixer 62a and applied through the filter 68a to the right hand set of input terminals of the phase meter 64a. As previously indicated, the phase sensitivity of the 90 cycle position indicating and reference signals is determined by the ratio between the mean frequencies of the waves transmitted by the pair of transmitters 15' and 18' from which the 250 cycle beat frequency signal was produced and the pair of transmitters 55a and 56a from which the 340 cycle beat frequency was produced. Since, with respect to each of these pairs of transmitters, the transmitter at the unit 12' is of higher frequency than the transmitter at the unit 11', thereby providing a phase shift of the same sence in each of the beat frequency signals, heterodyning the 250 cycle and 340 cycle beat frequency signals in the mixer 62a, produces an output signal, the phase sensitivity of which depends upon the difference between the 1750.170 kilocycle mean frequency of the transmitters 55a and 56a and the 1700.125 kilocycle mean frequency of the transmitters 15' and 18'. In other words, the phase sensitivity of the 90 cycle position indicating signal supplied to the phase meter 64a corresponds to a carrier signal of approximately 50.045 kilocycles which may be termed a phantom frequency equal to the difference between the real mean frequencies. Thus when the 90 cycle position indicating signal is phase compared with the 90 cycle reference signal supplied from the beat mixer 63a, a much smaller number of lanes or 360° phase coincidences between the transmitting units 11' and 12' will be obtained and these isophase lines will be spaced apart along the line joining the units 11' and 12' a distance equal to one-half the wave length of a wave having a frequency of 50.045 kilocycles or a distance of approximately 9750 feet. It will thus be observed that the phase meter 64a provides a position indication of relatively low phase sensitivity which identifies the position of the mobile receiving unit 14' within a zone having a minimum width of 9750 feet. The phase meter 41', on the other hand, has applied to its opposite set of input terminals the direct heterodyne signal output of the receiver 39' through the band pass filter 44' and the 250 cycle reference signal appearing at the output of the receiver 40' through the band pass filter 45'. The phase meter 41' thus registers the position of the mobile receiving unit 14' between adjacent isophase lines effectively produced in space as a result of carrier wave radiation from the transmitters 15' and 18'. The isophase lines thus produced are spaced apart on a line joining the units 11' and 12' by a distance equal to one-half wave length of the mean frequency of the radiated carrier waves or approximately 289 feet. The reading on the phase meter 41' may thus be termed a high phase sensitivity indication since it identifies the position of the receiving unit between equiphase lines characterized by closely spaced phase coincidences. The low phase sensitivity reading obtained from the meter 64a may be employed to ascertain within which of the pairs of isophase lines spaced 289 feet apart as indicated by the phase meter 41' the mobile receiving unit 14' is positioned.

At the end of the above-described transmitting interval the signal output of the delay circuit 32' functions to change the position of the control switch 16' thus terminating the radiation of the 1700.000 kilocycle carrier wave radiated by the transmitter 15' and the 1750.000 kilocycle carrier wave radiated by the transmitter 55a. Energization of the switch 16' also places the receivers 24' and 58a in operation and renders the receiver 30' ineffective to receive carrier wave signals. When the radiation by the transmitter 55a and the 1700.000 kilocycle carrier wave radiation by the transmitter 15' is terminated, the heterodyne action taking place at the receivers 28' and 60a at the unit B' and at the receivers 39' and 61a at the mobile receiving unit 14' is immediately interrupted. The phase meters 41' and 64a no longer receive excitation signals from the receiver 39' and from beat mixer 62a, respectively, with the result that these meters are rendered ineffective to alter the position of their indicating elements after the expiration of the first transmitting interval. Concurrently with the energization of the control switch 16' by the output of the delay circuit 32', the control switch 22' in the unit 13' returns to its normal position thus converting the output frequency of the transmitter 21' from 1800.000 kilocycles to 1700.700 kilocycles and at the same time rendering the receivers 28' and 60a inoperative and the receiver 36' operative. With the receivers 28' and 60a both inoperative, no modulation signals are delivered to the modulator 23' thus insuring that during this second interval of operation the transmitter 21' will radiate an unmodulated carrier wave. In addition to the functions enumerated above, the return of the switch 22' to its normal position places the transmitter 57a in operation to radiate a 1750.910 kilocycle carrier wave. Thus at the end of the first transmitting interval the transmitter 18' continues to radiate a 1700.250 kilocycle carrier wave, the transmitter 56a continues to radiate a 1750.340 kilocycle carrier wave and the transmitters 21' and 57a in the unit 13' are immediately placed into operation to radiate carrier waves at the frequencies indicated above. The carrier waves radiated by the transmitters 18' and 21' during the second transmitting interval are accepted by the receiver 24' at the unit 11', as indicated by the broken line arrows 82 and 83. The 450 cycle beat frequency between these signals is applied through the band pass filter 25' and through the closed contacts of the control switch 16' to the modulator 17' for amplitude modulation upon the carrier wave of 1800.000 kilocycles radiated by the transmitter 15'. As indicated by the broken line arrows 84 and 85, the receiver 58a at the unit 11' functions to heterodyne the carrier waves radiated by the transmitters 57a and 56a and this receiver reproduces the 570 cycle difference frequency therebetween at its output terminals. This 570 cycle heterodyne signal is applied through the signal connections 58c and the closed contacts of the control switch 16' to the modulator 17' for amplitude modulation upon the 1800.000 kilocycle carrier wave output of the transmitter 15' simultaneously with the modulation of the 450 cycle output of the receiver 24'. Therefore during the second transmitting interval the transmitter 15' radiates an 1800.000 kilocycle carrier wave which is modulated with both 450 and 570 cycle modulation signals. The modulated carrier wave, as indicated by the broken line arrow 86, is received at the receiver 33' of the unit 12' where the 250 cycle modulation component is selected by the band pass filter 34' for application to the delay circuit 35'. This delay circuit introduces an approximately one-third second delay to the signal output of the band pass filter 34' before application of this signal to the control switch 19'. It will be understood that the 1800.000 kilocycle modulated carrier wave radiated by the transmitter 15' will also be received by the receiver 36', but the band pass filter 37' rejects both of the modulation signals and therefore prevents a disturbance of the operating conditions existing at the transmitting unit 13'.

The modulated carrier wave radiated by the transmitter 15' of the unit 11', as indicated by the broken line arrow 87, is received by the receiver 40' which reproduces both of the modulation signals of 450 cycles and 570 cycles at its output terminals. The 450 cycle signal is applied through the band pass filter 47' to the left hand set of input terminals of the phase meter 42' for use as a reference signal for phase comparison with the heterodyne signal derived from heterodyning the position indicating signal radiated by the transmitters 18' and 21'. The filters 45' and 49' reject both of the modulation signals appearing at the output of the receiver 40' thus insuring that the phase meters 41' and 43' will be inactive during the second interval of operation. However, both of the signals developed by the receiver 40' are applied to the beat mixer 63a which heterodynes these signals and produces 120 cycle beat frequency signals at its output terminals for application through the band pass filter 69a to the left hand set of terminals of the phase meter 65a. During this same interval the receiver 39' is responsive to the carrier waves radiated by the transmitters 18' and 21' as indicated by the broken line arrows 88 and 89. The difference frequency of 450 cycles existing between these two carrier waves is reproduced at the output terminals of the receiver 39' and applied both to the beat mixer 62a and to the right set of input terminals of the phase meter 42' through the band pass filter 46'. At the same time the receiver 61a as indicated by the broken line arrows 90 and 91 is responsive to the carrier waves radiated by the transmitters 56a and 57a. The beat frequency of 570 cycles existing between these two carrier waves is reproduced at the output terminals of this receiver and applied to the beat mixer 62a where it is heterodyned with the 450 cycle beat frequency signal produced by the receiver 39'. The beat mixer 62a functions to heterodyne the two signals applied thereto and to reproduce a 120 cycle signal which is applied through the band pass filter 70a to the right hand set of input terminals of the phase meter 65a. The phase meter 65a thus functions to measure the phase relationship between the 120 cycle output signals of the beat mixers 62a and 63a thereby providing a coarse position indication of low phase sensitivity representative of the position of the mobile receiving unit 14' between widely spaced isophase lines produced between the transmitting units 12' and 13'. The phase meter 42' provides a fine position indication of high phase sensitivity representing the position of the mobile receiving unit 14' between closely spaced isophase lines produced between the transmitting units 12' and 13' as a result of carrier wave radiation by the transmitters 18' and 21'.

For the reasons pointed out in connection with the description of the first interval of operation, the indications provided by the phase meter 65a will correspond to a phase sensitivity having isophase lines spaced approximately 9750 feet apart on a line joining the units 12' and 13' and the position indications provided by the phase meter 42' will have a phase sensitivity corresponding to isophase lines spaced approximately 289 feet apart on this same line. It will thus be seen that the low phase sensitivity reading obtained from the phase meter 65a may be employed to establish the particular pair of isophase lines spaced 289 feet apart, as indicated by the phase meter 42', between which the mobile receiving unit 14' is positioned.

At the end of the second interval of operation the delay circuit 35' delivers a signal to the control switch 19' at the unit 12' thereby energizing this switch and changing the output frequency of the transmitter 18' from 1700.250 kilocycles to 1800.000 kilocycles. Actuation of the switch 19' deenergizes the transmitter 56a and the receiver 33' and at the same time places the receivers 26' and 59a in operation. The interruption of the carrier wave radiation by the transmitter 56a terminates the heterodyne action occurring at the receivers 58a and 61a whereas the cessation of 1700.250 kilocycle carrier wave radiation by the transmitter 18' interrupts the heterodyne action occurring at the receivers 24' and 39'. The phase meters 42' and 65a at the mobile receiving unit 14' are therefore rendered ineffective to alter the position of their indicating elements and these positions will be maintained between the intervals when the phase meters 42' and 65a are energized.

As soon as the control switch 19' is energized by the output signals from the delay circuit 35', the switch 16' is restored to its normal position with the result that the output frequency of the transmitter 15' is converted from 1800.000 kilocycles to 1700.000 kilocycles and the transmitter 55a is again placed into operation. With the restoration of the control switch 16' to its normal position the receivers 24' and 58a are rendered inoperative and the receiver 30' is again rendered effective to receive wave signals. Thus at the end of the second transmitting interval, the transmitter 21' at the unit 13' continues to radiate a 1700.700 kilocycle position indicating signal and the transmitter 57a at this unit continues to radiate a 1750.910 kilocycle position indicating carrier wave. At the end of the second transmitting interval, the transmitter 15' is placed into operation to radiate a 1700.000 kilocycle carrier wave and the transmitter 55a at the unit 11' is rendered operative to radiate a 1750.000 kilocycle carrier wave. With the transmitters 15' and 21' simultaneously operative, carrier waves of 1700.000 and 1700.700 kilocycles as indicated by the dot-dash arrows 92 and 93 are received by the receiver 26'. The difference frequency of 700 cycles existing between these two carrier waves is developed by heterodyning the waves at the receiver 26' and is applied through the band pass filter 27' and closed contacts of the control switch 19' to the modulator 20' for amplitude modulation upon the 1800.000 kilocycle carrier wave radiated by the transmitter 18'. The receiver 59a at the transmitting unit 12' functions to heterodyne the carrier waves indicated by the dot-dash arrows 94 and 95 and radiated by the transmitters 55a and 57a. The difference frequency signal of 910 cycles is reproduced by the receiver 59a and applied through closed contacts of the control switch 19' to the modulator 20' for amplitude modulation upon the carrier wave output of the transmitter 18' simultaneously with the modulation of the 700 cycle output of the receiver 26'. Therefore, during the third interval of operation the transmitter 18' radiates an 1800.000 kilocycle carrier wave modulated by reference signals of 700 and 910 cycles. This modulated carrier wave as indicated by the dot-dash arrow 96 is accepted by the receiver 36' at the unit 13' and the modulation component of 700 cycles is selected by the band pass filter 37' for application to the delay circuit 38'. The delay circuit 38' prevents the application of this signal to the control switch 22' until the expiration of an approximately one-third second delay period during which the third interval of operation of the transmitting units 11', 12' and 13' occurs.

The modulated carrier wave radiated by the transmitter 18' during the third interval is accepted, as indicated by the dot-dash arrow 97, by the receiver 40' which reproduces both of the modulation components at its output terminals. The 700 cycle modulation signal is applied through the band pass filter 49' to the left hand set of input terminals of the phase meter 43' but the filters 45', 47' and 49' function to reject the 910 cycle modulation signal. Both the 700 and 910 cycle signals are applied to the beat mixer 63a which heterodynes them to produce a 210 cycle difference frequency signal which is applied through the band pass filter 71a to the left hand set of input terminals of the phase meter 66a. The position indicating signals radiated by the transmitters 15' and 21' during the third interval of operation, as indicated by the broken line arrows 98 and 99, are both accepted by the receiver 39' and are heterodyned to produce a 700 cycle beat frequency or difference signal. This signal is applied through the band pass filter 48' to the right hand set of input terminals of the phase meter 43' with the result that this meter provides a high phase sensitivity indication representative of the position of the mobile receiving unit 14' between adjacent closely spaced isophase lines produced in space between the units 11' and 13'. The carrier waves radiated by the transmitters 55a and 57a as indicated by the arrows 100 and 101 are both accepted by the receiver 61a which functions to heterodyne these waves and produce a 910 cycle beat frequency signal. This latter signal is applied to the beat mixer 62a where it is heterodyned with the 700 cycle beat frequency signal produced at the output of the receiver 39', thus providing a 210 cycle signal at the output of the beat mixer 62a which is applied through the band pass filter 72a to the right hand set of input terminals of the phase meter 66a. The phase meter 66a thus registers the phase relationship between the two applied signal voltages, thereby providing a coarse position indication of low sensitivity representative of the position of the mobile unit 14' relative to the transmitting units 11' and 13'.

For the reasons pointed out in connection with the description of the first interval of operation, the position indications provided by the phase meter 43' will correspond to a phase sensitivity having isophase lines spaced approximately 289 feet apart on a line joining the units 11' and 13' and the position indications produced by the phase meter 66a will have a phase sensitivity corresponding to isophase lines spaced approximately 9750 feet apart on this same line. It will thus be seen that the phase meters 41', 42' and 43' and the phase meters 64a, 65a and 66a function alternately to provide fine and coarse position indications of the mobile receiving unit 14' relative to three different pairs of transmitters, i. e., the units 11' and 12', the units 12' and 13', and the units 11' and 13', whereby a completely unambiguous and highly accurate fix of the position of the mobile receiving unit 14' is obtained providing the transmitting units 11', 12' and 13' are not separated by more than 9750 feet. In other words, two groups of three intersecting isophase lines of hyperbolic pattern are provided by the indications of the phase meters, one group comprising a hyperbolic pattern in which the isophase lines are spaced approximately 289 feet apart along the base lines of the respective pairs of transmitters and the other group comprising similar patterns in which the isophase lines are spaced approximately 9750 feet apart. If the transmitting units 11', 12' and 13' are spaced apart a distance in excess of 10,000 feet, it is apparent that complete ambiguity resolution is not provided but the positions in the survey area in which similar coarse phase meter readings could be obtained are so widely separated that a knowledge of the approximate location of the mobile receiving unit within a range of several miles will completely obviate ambiguity problems.

At the end of the third interval of operation, the delay circuit 38' functions to energize the switch 22' thereby converting the output frequency of the transmitter 21' from 1700.700 kilocycles to 1800.000 kilocycles and at the same time terminating carrier wave radiation by the transmitter 57a. Energization of the switch 22' deactivates the receiver 36' and places the receivers 28' and 60a in operation. Interruption of carrier wave radiation by the transmitter 57a terminates the heterodyne action occurring at the receiver 59a and at the receiver 61a whereas the cessation of the 1700.700 kilocycle carrier wave radiation by the transmitter 21' halts the heterodyne action occuring at the receiver 26' and at the receiver 39'. At the end of the third transmitting interval the switch 19' will be restored to normal operation and the output frequency of the carrier wave radiated by the transmitter 18' will be changed from 1800.000 kicocycles to 1700.250 kilocycles and radiation of a 1750.340 kilocycle carrier wave by the transmitter 56a will be resumed. Thus at the end of the third interval of operation, the transmitter 15' of the unit 11' continues to radiate a 1700.000 kilocycle carrier wave and the transmitter 55a continues to radiate a 1750.000 kilocycle carrier wave. With the transmitters 55a and 56a in operation and with the transmitters 15' and 18' radiating carrier waves at frequencies of 1700.000 and 1700.250 kilocycles, respectively, the transmitting cycle again commences with the results indicated above.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. A position determining system comprising at least three spaced transmitters for radiating waves of identical frequency to a receiving point, means for rendering said transmitters sequentially operative to radiate to said receiving point at least three position indicating waves at different frequencies, means responsive to at least one of said last-named waves for successively modulating the identical frequency waves radiated by said spaced transmitters with reference signals, and receiving and translating apparatus at said receiving point jointly responsive to said position indicating and reference signals for producing at least three indications respectively representative of the position of said receiving point relative to different ones of said transmitters.

2. A position determining system comprising at least three spaced transmitters for sequentially radiating a first group of waves of identical frequency to a receiving point, means for rendering said transmitters sequentially operative to radiate to said receiving point a second group of at least three position indicating waves at different frequencies, each of the second group of waves radiated by said transmitters differing from the other two waves of said second group by different predetermined difference frequencies, means successively responsive to at least one of the waves of said second group for successively modulating each of the waves of said first group with reference signals having frequencies related to said different predetermined difference frequencies, and receiving and translating apparatus at said receiving point jointly responsive to said position indicating and reference signals for producing at least three indications respectively representative of the position of said receiving point relative to different ones of said transmitters.

3. A position determining system comprising at least three spaced transmitters for radiating waves of identical frequency to a receiving point, means for sequentially changing the output frequency of each of said transmitters to radiate to said receiving point at least three position indicating waves at different frequencies, a first of the position indicating waves differing from a second of the position indicating waves by a first predetermined difference frequency, the second of the position indicating waves differing from a third of the position indicating waves by a second predetermined difference frequency, and the third of the position indicating waves differing from the first position indicating wave by a third predetermined difference frequency, means successively responsive to the first and second position indicating waves for alternately modulating the identical frequency wave radiated by a first of said transmitters with a reference signal having a frequency related to said first predetermined difference frequency, for modulating the identical frequency wave radiated by a second of said transmitters with a reference signal having a frequency related to said second difference frequency and for modulating the identical frequency wave radiated by the third of said transmitters with a reference signal having a frequency related to said third difference frequency, and receiving and translating apparatus at said receiving point jointly responsive to said position indicating and reference signals for producing at least three indications respectively representative of the position of said receiving point relative to different ones of said transmitters.

4. In a position indicating system of the type requiring the transmission of signals from both position indicating transmitters which radiate position indicating signals and link transmitters which radiate reference signals, at least three spaced transmitters for radiating position indicating signals, means for sequentially changing the output frequency of each of said transmitters, and means responsive to the signals radiated by the unchanged transmitters for sequentially converting each of the changed transmitters into link transmitters.

5. A wave signal transmission system comprising at least three spaced transmitting units for radiating two groups of waves, all of the waves of a first of said groups having the same frequency and all of the waves of the second group having different frequencies, each of said units including means for sequentially radiating at spaced intervals one wave of the first group and one wave of the second group, and means associated with each of the units and responsive only to pairs of the waves of the second group for intermittently modulating in succession the waves of the first group radiated by the three units with reference signals having frequencies related to the difference frequencies between the frequencies of the individual pairs of waves of said second group.

6. A wave signal transmission system comprising at least three spaced transmitting units for radiating two groups of waves, all of the waves of at least one of said groups having different frequencies, each of said units including means for sequentially radiating first one wave of the first group and next one wave of the second group, and means respectively associated with each of the units and selectively responsive to the waves of the first group for alternately changing the frequency of the wave radiated by the associated unit from one of the waves of the second group to one of the waves of the first group.

7. A wave signal transmission system comprising at least three spaced transmitting units for radiating two groups of waves, all of the waves of a first of said groups having the same frequency and all of the waves of the second group having different frequencies, each of said units including means for sequentially radiating at spaced intervals one wave of the first group and one wave of the second group, means for sequentially modulating the waves of the first group radiated by each of said transmitting units with a reference signal, and means responsive to the modulated wave of said first group for successively changing the output wave radiated by another of said transmitting units from a wave of the second group to one of the waves of the first group.

8. A wave signal transmission system comprising at least three spaced transmitting units for radiating two groups of waves, each of said units including means for sequentially radiating at spaced intervals one wave of the first group and one wave of the second group, receiving means associated with a first of the three units and selectively responsive only to the waves of the second group radiated by the second and third transmitting units for heterodyning the waves to which it is responsive and for reproducing a first difference frequency signal, means responsive to said first difference frequency signal for impressing said signal upon the wave of the first group radiated by said first unit, receiving means associated with a second of said three units responsive only to the waves of the second group radiated by the first and third transmitting units for heterodyning the waves to which it is responsive and for reproducing a second difference frequency signal, means responsive to said second difference frequency signal for impressing said signal upon the wave of the first group radiated by said second unit, receiving means associated with the third unit responsive to the waves of the second group radiated by the first and second transmitting units for heterodyning the waves to which it is responsive and for reproducing a third difference frequency signal, means responsive to said third difference frequency signal for impressing said third signal upon the wave of the first group radiated by said third unit, additional receiving means associated with each of said units for receiving the waves of the first group radiated by another of said units and for reproducing the difference frequency impressed upon the received wave, and switching means associated with each of said units and responsive to the respective difference frequency signals reproduced by said additional receiving means for converting the output wave radiated by its associated transmitting unit from a wave of one of said groups to a wave of the other of said groups.

9. In a position indicating system of the type requiring the transmission of signals from both position indicating transmitters which radiate position indicating signals and link transmitters which radiate reference signals, at least three spaced transmitting units for radiating position indicating signals at one frequency and carrier waves at a different frequency, modulating means individually associated with said transmitting units and each operative to modulate the carrier wave radiated by the associated transmitting unit with a reference signal, thereby to convert the associated transmitting unit into a link transmitter, and switching means associated with each of said transmitting units and responsive to the modulated carrier wave radiated by another of the transmitting units for changing the output frequency of the associated transmitting units.

10. In a position indicating system of the type requiring the transmission of signals from both position indicating transmitters which radiate position indicating signals and link transmitters which radiate reference signals, at least three spaced transmitting units for radiating position indicating signals at one frequency and carrier waves at a second frequency, modulators individually associated with said transmitting units and each operative to modulate the carrier wave radiated by the associated transmitting unit with a reference signal, thereby to convert the associated transmitting unit into a link transmitter, and switching means associated with each of said transmitting units and responsive to the modulated carrier wave radiated by another of the transmitting units for successively changing the output wave of each of said transmitting units from one of said position indicating signals to one of said carrier waves, said switching means also rendering each of said modulators ineffective to modulate the position indicating signal radiated by the associated transmitting unit between the intervals when the associated transmitting unit is operating to radiate the modulated carrier wave.

11. A wave signal transmission system for radiating position indicating waves including a plurality of spaced transmitting units for radiating position indicating signals at different frequencies, means for rendering different pairs of said transmitting units successively operative to radiate position indicating signals during spaced intervals, and means for rendering each of said transmitting units operative to radiate modulated carrier waves of different frequency from said position indicating signals between the intervals when the position indicating signals are radiated.

12. A wave signal transmission system comprising a plurality of spaced transmitters for radiating position indicating signals at different frequencies, means for sequentially rendering said transmitters operative in pairs to radiate said position indicating signals at spaced intervals, modulating means responsive to the signals radiated by the operative pair of transmitters for modulating the wave radiated by another of said transmitters with a reference signal, and means for altering the output frequency of each of said transmitters during the interval when its associated modulating means is operative.

13. A wave signal transmission system for radiating position indicating signals comprising at least three spaced transmitting units for radiating position indicating signals at different frequencies, switching means for sequentially rendering each of said transmitting units operative to radiate carrier waves at a different frequency from the position indicating signal, means for modulating said carrier waves, receiving means associated with each of said transmitting units for reproducing the modulation signal on the carrier wave radiated by one of the other transmitting units and means responsive to said modulation signal for actuating said switching means to change the wave radiated by its associated transmitting unit from one of said position indicating signals to one of said carrier waves.

14. A wave signal transmission system for radiating position indicating waves comprising at least three spaced transmitting units for radiating position indicating signals at different frequencies, switching means for sequentially rendering each of said transmitting units operative to radiate a carrier wave of still different frequency, and delay means responsive to the carrier wave radiated by one of said transmitting units for actuating the switching means of another of said transmitting units to convert the wave radiated thereby from one of said position indicating signals to one of said carrier waves only after the expiration of a predetermined interval.

15. A wave signal transmission system comprising at least three spaced transmitting units for radiating four carrier waves having different frequencies, all of said units including means for sequentially radiating a first of said carrier waves and each of said units including means for radiating one of the other three carrier waves, modulating means responsive to pairs of the other three carrier waves radiated by pairs of said units for successively modulating said first carrier wave radiated by each of said units with different reference signals having frequencies equal to the difference frequency between the pairs of waves to which said modulating means is responsive, receiving means associated with each of said transmitters for reproducing the modulation signal of said first carrier wave, and switching means actuated by said modulation signal for converting the output of the associated transmitter from one of said other three waves to said first carrier wave.

16. A wave signal transmission system comprising at least three spaced transmitting units for radiating four carrier waves having different frequencies, all of said units including means for sequentially radiating a first of said carrier waves and each of said units including means for radiating one of the other three carrier waves, modulating means responsive to pairs of the other three carrier waves radiated by pairs of said units for successively modulating said first carrier wave radiated by each of said units with different reference signals having frequencies equal to the difference frequency between the pairs of waves to which said modulating means is responsive, receiving means associated with each of said units for reproducing the modulation signal of said first carrier wave, switching means actuated by said modulation signal for converting the output frequency of the associated transmitting unit from one of said other three waves to said first carrier wave, and delay means interposed between each of said receiving means and said switching means for delaying the actuation of said switching means for a predetermined interval.

17. A wave signal transmission system comprising at least three spaced transmitting units for radiating two groups of waves, the waves of a first of said groups having different frequencies from the waves of the second group, each of said units including means for alternately radiating one wave of each group, receiving means associated with a first of the three units and selectively responsive only to the waves of said second group radiated by a second and third of the units for heterodyning the waves to which it is responsive and for modulating the difference frequency signal upon the wave of the first group radiated by said first unit, receiving means associated with said second unit and responsive only to the waves of said second group radiated by said first and third units for heterodyning the waves to which it is responsive and for modulating the difference frequency signal upon the wave of the first group radiated by said second unit, receiving means associated with said third unit and responsive only to the waves of said second group radiated by said first and second units for heterodyning the waves to which it is responsive and for modulating the difference frequency signal upon the wave of the first group radiated by said third unit, switching means associated with said first unit selectively responsive to the modulated wave of the first group radiated by said third unit for converting the output wave radiated by said first unit from a wave of the second group to a wave of the first group, switching means associated with said second unit selectively responsive to the modulated wave of the first group radiated by said first unit for converting the output wave radiated by said second unit from a wave of the second group to a wave of the first group, and switching means associated with said third unit selectively responsive to the modulated wave radiated by said second unit for converting the output wave of said third unit from a wave of the second group to a wave of the first group.

18. A wave signal transmission system comprising at least three spaced transmitting units for radiating two groups of waves, the waves of a first of said groups having different frequencies from the waves of the second group, each of said units including means for alternately radiating one wave of each group, receiving means associated with a first of the three units and selectively responsive only to the waves of said second group radiated by a second and third of the units for heterodyning the waves to which it is responsive and for modulating the difference frequency signal upon the wave of the first group radiated by said first unit, receiving means associated with said second unit and responsive only to the waves of said second group radiated by said first and third units for heterodyning the waves to which it is responsive and for modulating the difference frequency signal upon the wave of the first group radiated by said second unit, receiving means associated with said third unit and responsive only to the waves of said second group radiated by said first and second units for heterodyning the waves to which it is responsive and for modulating the difference frequency signal upon the wave of the first group radiated by said third unit, additional receiving means associated with said first unit for reproducing the modulation component of the wave of the first group radiated by said third unit, a first switching means responsive to said modulation component for converting the output wave radiated by the first unit from a wave of the second group to a wave of the first group, delay means interposed between said additional receiving means and said first switching means for delaying the actuation of said switching means for a first predetermined interval, other receiving means associated with said second unit for reproducing the modulation component of the wave of the first group radiated by said first unit, second switching means actuated by said last-named modulation component for converting the output wave radiated by said second unit from a wave of the first group to a wave of the second group, delay means interposed between said second switching means and said last-named receiving means for preventing the actuation of said second switching means until the expiration of a second predetermined interval, additional receiving means associated with said third unit for reproducing the modulation component of the wave of the first group radiated by said second unit, third switching means actuated by said last-named modulation component for converting the output wave radiated by said third unit from a wave of the second group to a wave of the first group, and delay means interposed between said third switching means and said last-named receiving means for preventing the actuation of said third switching means until the expiration of a third predetermined interval.

19. A wave signal transmission system comprising a first transmitter for radiating position indicating and carrier wave signals at spaced intervals, a second transmitter for radiating position indicating and carrier wave signals at spaced intervals, a third transmitter for radiating position indicating and carrier wave signals at spaced intervals, modulating means responsive to the position indicating signals radiated by said second and third transmitters for modulating at spaced periods the carrier wave signal radiated by said first transmitter with a reference signal, and switching means controlled by the modulated carrier wave signal radiated by said first transmitter for rendering at least one of the other transmitters inoperative to radiate position indicating signals in an interval between the periods when said first transmitter is modulated.

20. In a position indicating system of the type requiring the transmission of signals from both position indicating transmitters which radiate position indicating signals and link transmitters which radiate reference signals at least three spaced transmitting units, each of which radiates carrier waves at two different frequencies, converting means responsive to carrier wave radiation at one of said frequencies by at least one of said transmitting units for converting the output of another of said transmitting units from a wave of a first of said frequencies to a wave of a second of said frequencies, and means controlled by said converting means for successively modulating only the wave of the second frequency radiated by each of said transmitting units thereby converting each of the units into a link transmitter when it is radiating the wave of the second of said frequencies.

21. A wave signal transmission system comprising a first transmitter for radiating position indicating and carrier wave signals at spaced intervals, a second transmitter for radiating position indicating and carrier wave signals at spaced intervals, a third transmitter for radiating position indicating and carrier wave signals, modulating means responsive to the position indicating signals radiated by said second and third transmitters for modulating the carrier wave signal radiated by said first transmitter with a reference signal, and switching means controlled by the modulated carrier wave signal radiated by said first transmitter for controlling the duration of the interval during which the carrier wave is radiated by said second transmitter.

22. A wave signal transmission system comprising a first transmitter for radiating position indicating and carrier wave signals at spaced intervals, a second transmitter for radiating position indicating and carrier wave signals at spaced intervals, a third transmitter for radiating position indicating and carrier wave signals, modulating means responsive to the position indicating signals radiated by said second and third transmitters for modulating the carrier wave signal radiated by said first transmitter with a reference signal during a predetermined interval, and switching means associated with said second transmitter and responsive to the modulated carrier wave signal radiated by said first transmitter for rendering said second transmitter operative to radiate its carrier wave signal at the end of said predetermined interval.

23. A wave signal transmission system comprising a first transmitter for radiating position indicating and carrier wave signals at spaced intervals, a second transmitter for radiating position indicating and carrier wave signals at spaced intervals, a third transmitter for radiating position indicating and carrier wave signals at spaced intervals, modulating means responsive to the position indicating signals radiated by said second and third transmitters for modulating the carrier wave signal radiated by said first transmitter with a reference signal during a predetermined interval, switching means associated with said second transmitter for converting the output of said transmitter from a position indicating signal to its carrier wave signal, and delay means connected to said switching means for preventing the actuation of said switching means until the end of said predetermined interval.

24. A wave signal transmission system comprising three transmitters positioned at the apexes of a triangle, means for rendering said transmitters successively operative to radiate modulated carrier waves during different spaced intervals, and means responsive to the modulated carrier wave radiation from one of the other transmitters for rendering each transmitter operative to radiate position indicating signals in the intervals between the radiation of said modulated carrier waves.

25. A wave signal transmission system comprising three transmitters positioned at the apexes of a triangle, each of said transmitters being operative to radiate position indicating signals for two successive intervals and to radiate a modulated carrier wave during a different interval, modulating means responsive to the position indicating signals radiated by two of said transmitters for effecting the modulation of the other transmitter during said different intervals, and means responsive to the modulated wave radiated by said other transmitter for changing the output wave of one of said two transmitters from a position indicating signal to a modulated carrier wave during said two intervals.

26. In a position indicating system of the type requiring the transmission of signals from both position indicating transmitters which radiate position indicating signals and link transmitters which radiate reference signals, at least three spaced transmitters for radiating position indicating signals, at least three additional transmitters for radiating different position indicating signals, means for sequentially changing the output frequency of each of said first named transmitters, means responsive to the signals radiated by the two unchanged first-named transmitters for sequentially converting each of the changed first-named transmitters into link transmitters, and means for rendering at least one of said additional transmitters inoperative during the period when the output frequency of each of said first-named transmitters is changed.

27. In a position indicating system of the type requiring the transmission of signals from both position indicating transmitters which radiate position indicating signals and link transmitters which radiate reference signals, at least three spaced transmitters for radiating position indicating signals, at least three additional transmitters for radiating different position indicating signals, means for sequentially changing the output frequency of each of said first-named transmitters, means for rendering one of said additional transmitters inoperative during the period when the output frequency of one of said first-named transmitters is changed, and means responsive to the signals radiated by the two unchanged first-named transmitters and to the signals radiated by the two operative additional transmitters for sequentially converting each of the changed, first-named transmitters into link transmitters.

28. A wave signal transmission system comprising at least three spaced transmitting units for radiating three groups of waves, all of the waves of a first of said groups having the same frequency and all of the waves of the second and third groups having different frequencies, each of said units including means for sequentially radiating at spaced intervals one wave of the first group and one wave of the second group, said means also rendering each of said units operative to radiate one wave of the third group only during the interval when that unit is radiating a wave of the second group, and means associated with each of the units and responsive to pairs of waves of the second group and pairs of waves of the third group for intermittently modulating in succession the waves of the first group radiated by the three units with a plurality of reference signals having frequencies related to the difference frequencies between the frequencies of the individual pairs of waves of said second group and of said third group.

29. A wave signal transmission system comprising at least three spaced transmitting units for radiating three groups of waves, all of the waves of at least one of said groups having the same frequency, each of said units including means for sequentially radiating first one wave of the first group and next simultaneously radiating a wave of the second group and a wave of the third group, and means respectively associated with each of the units and selectively responsive to the waves of the first group for alternately changing the frequency of the wave radiated by the associated unit from one of the waves of the second group to one of the waves of the first group and at the same time terminating the radiation of the wave of the third group.

30. A wave signal transmission system comprising at least three spaced transmitting units for radiating three groups of waves all of the waves of a first of said groups having the same frequency and all of the waves of the second and third groups having different frequencies, each of said units including means for sequentially radiating at spaced intervals one wave of the first group and one wave of the second group, said means rendering each unit operative to transmit a wave of the third group only during the interval when a wave of the second group is being radiated by that unit, means for sequentially modulating the waves of the first group radiated by each of said transmitting units with at least one reference signal, and means responsive to the modulated wave of said first group for successively changing the output wave radiated by another of said transmitting units from a wave of the second group to one of the waves of the first group and at the same time terminating the radiation of the wave of the third group by said last-named unit.

31. In a position indicating system of the type requiring the transmission of signals from both position indicating transmitters which radiate position indicating signals and link transmitters which radiate reference signals, at least three spaced transmitting units each of which radiates two position indicating signals at different frequencies and a carrier wave at a still different frequency, modulators individually associated with said transmitting units and each operative to modulate the carrier wave radiated by the associated transmitting unit with a reference signal thereby to convert the associated transmitting unit into a link transmitter, and switching means associated with each of said transmitting units and responsive to the modulated carrier wave radiated by another of the transmitting units for rendering the associated transmitting unit inoperative to radiate either of the position indicating signals, and for rendering the associated transmitting unit operative to radiate a modulated carrier wave.

32. In a position indicating system of the type requiring the transmission of signals from both position indicating transmitters which radiate position indicating signals and link transmitters which radiate reference signals, at least three spaced transmitting units each of which radiates two position indicating signals at different frequencies and a carrier wave at a still different frequency, modulators individually associated with said transmitting units and each operative to modulate the carrier wave radiated by the associated transmitting unit with a reference signal thereby to convert the associated transmitting unit into a link transmitter, and switching means associated with each of said transmitting units and responsive to the modulated carrier wave radiated by another of the transmitting units for rendering the associated transmitting unit inoperative to radiate either of the position indicating signals, and for rendering the associated transmitting unit operative to radiate a modulated carrier wave, said switching means also rendering each of the modulators ineffective to modulate either of the position indicating signals radiated by the associated transmitting unit between the intervals when the associated transmitting unit is operative to radiate the modulated carrier wave.

33. A wave signal transmission system comprising at least three spaced transmitting units for radiating three groups of waves, each of said units including means for radiating one wave of the first group during a first interval and for radiating one wave of the second group and one wave of the third group during another interval, heterodyning means associated with a first of the three units for heterodyning the waves of the second group radiated by the second and third transmitting units and for reproducing a first difference frequency signal, other heterodyning means associated with said first unit for heterodyning the waves of the third group radiated by said second and third transmitting units and for reproducing a second difference frequency signal, means responsive to said first and second difference frequency signals for impressing both of said signals upon the wave of the first group radiated by said first unit, heterodyning means associated with a second of the three units for heterodyning the waves of the second group radiated by the first and third transmitting units and for reproducing a third difference frequency signal, other heterodyning means associated with said second unit for heterodyning the waves of the third group radiated by said first and third units and for reproducing a fourth difference frequency signal, means responsive to said third and fourth difference frequency signals for impressing both of said signals upon the wave of the first group radiated by said second unit, heterodyning means associated with said third unit for heterodyning the waves of the second group radiated by said first and second units and for reproducing a fifth difference frequency signal, other heterodyning means associated with said third unit for heterodyning the waves of the third group radiated by said first and second transmitting units and for reproducing a sixth difference frequency signal, means responsive to said fifth and sixth difference frequency signals for impressing both of said signals upon the wave of the first group radiated by said third unit, receiving means associated with each of said units for receiving the waves of the first group radiated by another of said units and for reproducing the difference frequencies impressed upon the received wave, and switching means associated with each of said units and responsive to at least one of the difference frequency signals reproduced by said receiving means for rendering the associated transmitting unit inoperative to radiate waves of the second and third group and for rendering the associated transmitting unit operative to radiate a wave of the first group.

34. A wave signal transmission system for radiating position indicating waves including a plurality of spaced transmitting units, each of which radiates a pair of position indicating signals and a carrier wave at different frequencies, means for rendering different pairs of said transmitting units successively operative to radiate at least two pairs of position indicating signals during spaced intervals, and means for rendering each of said transmitting units inoperative to radiate either of the position indicating signals and operative to radiate its modulated carrier wave between the intervals when the position indicating signals are radiated.

35. A wave signal transmission system comprising a plurality of spaced transmitters, each of which radiates a pair of position indicating signals and a carrier wave at different frequencies, means for sequentially and intermittently rendering said transmitters operative in pairs so that each transmitter simultaneously radiates both of its position indicating signals, modulating means responsive to the pairs of signals radiated by the operative pairs of transmitters for modulating the wave radiated by another of said transmitters with reference signals having frequencies related to the difference frequencies between the individual waves of the pairs of position indicating signals, and means for rendering each of said transmitters inoperative to radiate either of the position indicating signals and for rendering that transmitter operative to radiate its carrier wave during the interval when its associated modulating means is operative.

36. A wave signal transmission system for radiating position indicating signals comprising at least three spaced transmitting units, each of which radiates a plurality of position indicating signals at different frequencies, switching means for sequentially rendering each of said transmitting units inoperative to radiate position indicating signals and operative to radiate a carrier wave of different frequency from the position indicating signals, means for modulating said carrier waves, receiving means associated with each of said transmitting units for reproducing the modulation signal on the carrier wave radiated by one of the other transmitting units, and means responsive to said modulation signal for actuating said switching means thereby terminating the radiation of position indicating signals by the associated transmitting unit and rendering said unit operative to radiate its carrier wave.

37. A wave signal transmission system for radiating position indicating signals comprising at least three spaced transmitting units each of which radiates a plurality of position indicating signals at different frequencies, switching means for sequentially rendering each of said transmitting units operative to radiate a carrier wave of still different frequency and for rendering each unit inoperative to radiate said position indicating signals, and delay means responsive to the carrier wave radiated by one of said transmitting units for actuating the switching means of another of said transmitting units to terminate the radiation of said position indicating signals and to begin the radiation of one of said carrier waves only after the expiration of a predetermined interval.

References Cited in the file of this patent

UNITED STATES PATENTS

| | | |
|---|---|---|
| 2,611,127 | Palmer | Sept. 16, 1952 |
| 2,629,091 | Hawkins | Feb. 17, 1953 |